United States Patent
Chen et al.

(10) Patent No.: US 12,353,276 B2
(45) Date of Patent: Jul. 8, 2025

(54) FAULT ISOLATION FOR COMPOSED SERVICES

(71) Applicant: Dell Products L.P., Round Rock, TX (US)

(72) Inventors: Xiangping Chen, Sherborn, MA (US); William Price Dawkins, Lakeway, TX (US); Walter Aldrich O'Brien, Westborough, MA (US); Xunce Zhou, Harvard, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 114 days.

(21) Appl. No.: 18/348,582

(22) Filed: Jul. 7, 2023

(65) Prior Publication Data
US 2025/0013522 A1    Jan. 9, 2025

(51) Int. Cl.
G06F 11/07    (2006.01)
(52) U.S. Cl.
CPC ........ G06F 11/079 (2013.01); G06F 11/0766 (2013.01)
(58) Field of Classification Search
CPC ............................ G06F 11/079; G06F 11/0793
See application file for complete search history.

(56) References Cited

U.S. PATENT DOCUMENTS

| | | | |
|---|---|---|---|
| 2006/0010352 A1* | 1/2006 | Mukherjee | G06F 11/0775 714/E11.026 |
| 2013/0007741 A1* | 1/2013 | Britsch | G06F 9/45558 718/1 |
| 2023/0007741 A1 | 1/2023 | Lee | |

FOREIGN PATENT DOCUMENTS

DE    102019006539 A1 *    4/2020    .......... G06F 11/0709

OTHER PUBLICATIONS

Machine translation of DE-102019106539-A1 (Year: 2020).*

* cited by examiner

*Primary Examiner* — Michael Maskulinski
(74) *Attorney, Agent, or Firm* — Chamberlain Hrdlicka; Aly Z. Dossa

(57) ABSTRACT

A method for processing service fault assessment requests. The method includes: receiving a service fault assessment request concerning a new composed service; making a determination that the new composed service is already configured; based on the determination: building a service fault matrix for the new composed service; obtaining a cluster fault matrix for a composed service cluster to which the new composed service belongs; making a second determination, based on a search performed using the service fault matrix and the cluster fault matrix, that an overlapping composable resource has been identified; based on the second determination: generating a service fault assessment report including identification metadata associated with the overlapping composable resource; and providing the service fault assessment report in response to the service fault assessment request.

16 Claims, 19 Drawing Sheets

Example Service Fault Matrix A 200

| Possible Failure Events | Virtual Objects ||||||||||||||| 
| --- | --- | --- | --- | --- | --- | --- | --- | --- | --- | --- | --- | --- | --- | --- | --- |
|  | SN 1.1 | SN 1.2 | SN 2.1 | SN 3.1 | MN 1.1 | MN 2.1 | MN 2.2 | MN 3.1 | AN 1.1 | AN 2.1 | AN 3.1 | AN 3.2 | CS 1 | CS 2 | CS 3 |
| Storage Dev. 1.1 Failure | 1 | 0 | 0 | 0 | 0 | 0 | 0 | 0 | 0 | 0 | 0 | 0 | 0 | 0 | 0 |
| Storage Dev. 1.2 Failure | 0 | 1 | 0 | 0 | 0 | 0 | 0 | 0 | 0 | 0 | 0 | 0 | 0 | 0 | 0 |
| Storage Dev. 2.1 Failure | 0 | 0 | 0 | 0 | 1 | 0 | 0 | 0 | 0 | 0 | 0 | 0 | 0 | 0 | 0 |
| Memory Dev. 1.1 Failure | 0 | 0 | 0 | 0 | 0 | 1 | 0 | 0 | 0 | 0 | 0 | 0 | 0 | 0 | 0 |
| Memory Dev. 2.1 Failure | 0 | 0 | 0 | 0 | 1 | 0 | 0 | 0 | 0 | 0 | 0 | 0 | 0 | 0 | 0 |
| Memory Dev. 2.2 Failure | 0 | 0 | 0 | 0 | 0 | 0 | 0 | 0 | 0 | 1 | 0 | 0 | 0 | 0 | 0 |
| Accelerator Dev. 1.1 Failure | 0 | 0 | 0 | 0 | 0 | 0 | 0 | 0 | 0 | 0 | 0 | 0 | 1 | 0 | 0 |
| Accelerator Dev. 1.2 Failure | 0 | 1 | 0 | 0 | 1 | 0 | 0 | 0 | 0 | 0 | 0 | 0 | 0 | 0 | 0 |
| Accelerator Dev. 2.1 Failure | 0 | 0 | 0 | 0 | 0 | 0 | 0 | 0 | 0 | 0 | 0 | 0 | 1 | 0 | 0 |
| Storage Encl. 1 Failure | 0 | 0 | 0 | 0 | 0 | 1 | 0 | 0 | 1 | 0 | 0 | 0 | 0 | 0 | 0 |
| Storage Encl. 2 Failure | 0 | 0 | 0 | 0 | 0 | 0 | 0 | 0 | 0 | 0 | 0 | 0 | 1 | 0 | 0 |
| Memory Encl. 1 Failure | 0 | 0 | 0 | 0 | 0 | 0 | 0 | 0 | 0 | 0 | 0 | 0 | 0 | 0 | 0 |
| Memory Encl. 2 Failure | 0 | 0 | 0 | 0 | 0 | 0 | 0 | 0 | 0 | 0 | 0 | 0 | 1 | 0 | 0 |
| Accelerator Encl. 1 Failure | 0 | 0 | 0 | 0 | 0 | 0 | 0 | 0 | 0 | 0 | 0 | 0 | 0 | 0 | 0 |
| Accelerator Encl. 2 Failure | 0 | 0 | 0 | 0 | 0 | 0 | 0 | 0 | 0 | 0 | 0 | 0 | 1 | 0 | 0 |
| Comp. Serv. Host 1 Failure | 0 | 0 | 0 | 0 | 0 | 0 | 0 | 0 | 0 | 0 | 0 | 0 | 0 | 1 | 0 |
| Comp. Serv. Host 2 Failure | 0 | 0 | 0 | 0 | 0 | 0 | 0 | 0 | 0 | 0 | 0 | 0 | 0 | 0 | 0 |
| Comp. Serv. Host 3 Failure | 0 | 0 | 0 | 0 | 0 | 0 | 0 | 0 | 0 | 0 | 0 | 0 | 0 | 0 | 0 |

*FIG. 2A*

Example Service Fault Matrix B 202

| Possible Failure Events | SN 1.1 | SN 1.2 | SN 2.1 | SN 3.1 | MN 1.1 | MN 2.1 | MN 2.2 | MN 3.1 | AN 1.1 | AN 2.1 | AN 3.1 | AN 3.2 | CS 1 | CS 2 | CS 3 |
|---|---|---|---|---|---|---|---|---|---|---|---|---|---|---|---|
| Storage Dev. 1.1 Failure | 0 | 0 | 0 | 0 | 0 | 0 | 0 | 0 | 0 | 0 | 0 | 0 | 0 | 0 | 0 |
| Storage Dev. 1.2 Failure | 0 | 0 | 0 | 0 | 0 | 0 | 0 | 0 | 0 | 0 | 0 | 0 | 0 | 0 | 0 |
| Storage Dev. 2.1 Failure | 0 | 0 | 1 | 0 | 0 | 0 | 0 | 0 | 0 | 0 | 0 | 0 | 0 | 0 | 0 |
| Memory Dev. 1.1 Failure | 0 | 0 | 0 | 0 | 0 | 1 | 0 | 0 | 0 | 0 | 0 | 0 | 0 | 0 | 0 |
| Memory Dev. 2.1 Failure | 0 | 0 | 0 | 0 | 0 | 0 | 1 | 0 | 0 | 0 | 0 | 0 | 0 | 0 | 0 |
| Memory Dev. 2.2 Failure | 0 | 0 | 0 | 0 | 0 | 0 | 0 | 0 | 0 | 0 | 0 | 0 | 0 | 0 | 0 |
| Accelerator Dev. 1.1 Failure | 0 | 0 | 0 | 0 | 0 | 0 | 0 | 0 | 0 | 0 | 0 | 0 | 0 | 0 | 0 |
| Accelerator Dev. 1.2 Failure | 0 | 0 | 0 | 0 | 0 | 0 | 0 | 0 | 0 | 1 | 0 | 0 | 0 | 0 | 0 |
| Accelerator Dev. 2.1 Failure | 0 | 0 | 0 | 0 | 0 | 0 | 0 | 0 | 0 | 0 | 0 | 0 | 0 | 1 | 0 |
| Storage Encl. 1 Failure | 0 | 0 | 0 | 0 | 0 | 0 | 0 | 0 | 0 | 0 | 0 | 0 | 0 | 0 | 0 |
| Storage Encl. 2 Failure | 0 | 0 | 1 | 0 | 0 | 1 | 1 | 0 | 0 | 0 | 0 | 0 | 0 | 0 | 0 |
| Memory Encl. 1 Failure | 0 | 0 | 0 | 0 | 0 | 0 | 0 | 0 | 0 | 0 | 0 | 0 | 0 | 1 | 0 |
| Memory Encl. 2 Failure | 0 | 0 | 0 | 0 | 0 | 0 | 0 | 0 | 0 | 1 | 0 | 0 | 0 | 0 | 0 |
| Accelerator Encl. 1 Failure | 0 | 0 | 0 | 0 | 0 | 0 | 0 | 0 | 0 | 0 | 0 | 0 | 0 | 1 | 0 |
| Accelerator Encl. 2 Failure | 0 | 0 | 0 | 0 | 0 | 0 | 0 | 0 | 0 | 0 | 0 | 0 | 0 | 0 | 0 |
| Comp. Serv. Host 1 Failure | 0 | 0 | 0 | 0 | 0 | 0 | 0 | 0 | 0 | 0 | 0 | 0 | 0 | 1 | 0 |
| Comp. Serv. Host 2 Failure | 0 | 0 | 0 | 0 | 0 | 0 | 0 | 0 | 0 | 0 | 0 | 0 | 0 | 0 | 0 |
| Comp. Serv. Host 3 Failure | 0 | 0 | 0 | 0 | 0 | 0 | 0 | 0 | 0 | 0 | 0 | 0 | 0 | 0 | 0 |

Virtual Objects

FIG. 2B

Example Cluster Fault Matrix A 204

Virtual Objects

| Possible Failure Events | SN 1.1 | SN 1.2 | SN 2.1 | SN 3.1 | MN 1.1 | MN 2.1 | MN 2.2 | MN 3.1 | AN 1.1 | AN 2.1 | AN 3.1 | AN 3.2 | CS 1 | CS 2 | CS 3 |
|---|---|---|---|---|---|---|---|---|---|---|---|---|---|---|---|
| Storage Dev. 1.1 Failure | 1 | 0 | 0 | 0 | 0 | 0 | 0 | 0 | 0 | 0 | 0 | 0 | 0 | 0 | 0 |
| Storage Dev. 1.2 Failure | 0 | 1 | 0 | 0 | 0 | 0 | 0 | 0 | 0 | 0 | 0 | 0 | 0 | 0 | 0 |
| Storage Dev. 2.1 Failure | 0 | 0 | 1 | 0 | 0 | 0 | 0 | 0 | 0 | 0 | 0 | 0 | 0 | 0 | 0 |
| Memory Dev. 1.1 Failure | 0 | 0 | 0 | 0 | 1 | 0 | 0 | 0 | 0 | 0 | 0 | 0 | 0 | 0 | 0 |
| Memory Dev. 2.1 Failure | 0 | 0 | 0 | 0 | 0 | 1 | 0 | 0 | 0 | 0 | 0 | 0 | 0 | 0 | 0 |
| Memory Dev. 2.2 Failure | 0 | 0 | 0 | 0 | 0 | 0 | 1 | 0 | 0 | 0 | 0 | 0 | 0 | 0 | 0 |
| Accelerator Dev. 1.1 Failure | 0 | 0 | 0 | 0 | 0 | 0 | 0 | 0 | 1 | 0 | 0 | 0 | 0 | 0 | 0 |
| Accelerator Dev. 1.2 Failure | 0 | 0 | 0 | 1 | 0 | 0 | 0 | 0 | 0 | 0 | 0 | 0 | 0 | 0 | 0 |
| Accelerator Dev. 2.1 Failure | 0 | 0 | 0 | 0 | 0 | 0 | 0 | 0 | 0 | 1 | 0 | 0 | 0 | 0 | 0 |
| Storage Encl. 1 Failure | 1 | 1 | 0 | 0 | 0 | 0 | 0 | 0 | 0 | 0 | 0 | 0 | 0 | 0 | 0 |
| Storage Encl. 2 Failure | 0 | 0 | 1 | 1 | 0 | 0 | 0 | 0 | 0 | 0 | 0 | 0 | 0 | 0 | 0 |
| Memory Encl. 1 Failure | 0 | 0 | 0 | 0 | 1 | 1 | 1 | 0 | 0 | 0 | 0 | 0 | 0 | 0 | 0 |
| Memory Encl. 2 Failure | 0 | 0 | 0 | 0 | 0 | 0 | 0 | 0 | 0 | 0 | 0 | 0 | 0 | 0 | 0 |
| Accelerator Encl. 1 Failure | 0 | 0 | 0 | 0 | 0 | 0 | 0 | 0 | 1 | 1 | 0 | 0 | 0 | 0 | 0 |
| Accelerator Encl. 2 Failure | 0 | 0 | 0 | 0 | 0 | 0 | 0 | 0 | 0 | 0 | 0 | 0 | 0 | 0 | 0 |
| Comp. Serv. Host 1 Failure | 0 | 0 | 0 | 0 | 0 | 0 | 0 | 0 | 0 | 0 | 0 | 0 | 1 | 0 | 0 |
| Comp. Serv. Host 2 Failure | 0 | 0 | 0 | 0 | 0 | 0 | 0 | 0 | 0 | 0 | 0 | 0 | 0 | 1 | 0 |
| Comp. Serv. Host 3 Failure | 0 | 0 | 0 | 0 | 0 | 0 | 0 | 0 | 0 | 0 | 0 | 0 | 0 | 0 | 0 |

*FIG. 2C*

Example Cluster Fault Matrix B 206

| Possible Failure Events | SN 1.1 | SN 1.2 | SN 2.1 | SN 3.1 | MN 1.1 | MN 2.1 | MN 2.2 | MN 3.1 | AN 1.1 | AN 2.1 | AN 3.1 | AN 3.2 | CS 1 | CS 2 | CS 3 |
|---|---|---|---|---|---|---|---|---|---|---|---|---|---|---|---|
| Storage Dev. 1.1 Failure | 0 | 0 | 0 | 0 | 0 | 0 | 0 | 0 | 0 | 0 | 0 | 0 | 0 | 0 | 0 |
| Storage Dev. 1.2 Failure | 0 | 0 | 0 | 1 | 0 | 0 | 0 | 0 | 0 | 0 | 0 | 0 | 0 | 0 | 0 |
| Storage Dev. 2.1 Failure | 0 | 0 | 0 | 0 | 0 | 0 | 0 | 0 | 0 | 0 | 0 | 0 | 0 | 0 | 0 |
| Memory Dev. 1.1 Failure | 0 | 0 | 0 | 0 | 0 | 0 | 0 | 1 | 0 | 0 | 0 | 0 | 0 | 0 | 0 |
| Memory Dev. 2.1 Failure | 0 | 0 | 0 | 0 | 0 | 0 | 0 | 0 | 0 | 0 | 0 | 0 | 0 | 0 | 0 |
| Memory Dev. 2.2 Failure | 0 | 0 | 0 | 0 | 0 | 0 | 0 | 0 | 0 | 0 | 0 | 0 | 0 | 0 | 0 |
| Accelerator Dev. 1.1 Failure | 0 | 0 | 0 | 0 | 0 | 0 | 0 | 0 | 1 | 0 | 1 | 0 | 0 | 0 | 1 |
| Accelerator Dev. 1.2 Failure | 0 | 0 | 0 | 0 | 0 | 0 | 0 | 0 | 0 | 0 | 0 | 1 | 0 | 0 | 0 |
| Accelerator Dev. 2.1 Failure | 0 | 0 | 0 | 0 | 0 | 0 | 0 | 0 | 0 | 0 | 0 | 0 | 0 | 0 | 0 |
| Storage Encl. 1 Failure | 0 | 0 | 0 | 1 | 0 | 0 | 0 | 1 | 0 | 0 | 1 | 0 | 0 | 0 | 1 |
| Storage Encl. 2 Failure | 0 | 0 | 0 | 0 | 0 | 0 | 0 | 0 | 0 | 0 | 0 | 0 | 0 | 0 | 1 |
| Memory Encl. 1 Failure | 0 | 0 | 0 | 0 | 0 | 0 | 0 | 0 | 0 | 0 | 0 | 0 | 0 | 0 | 0 |
| Memory Encl. 2 Failure | 0 | 0 | 0 | 0 | 0 | 0 | 0 | 0 | 0 | 0 | 0 | 1 | 0 | 0 | 1 |
| Accelerator Encl. 1 Failure | 0 | 0 | 0 | 0 | 0 | 0 | 0 | 0 | 0 | 0 | 0 | 0 | 0 | 0 | 0 |
| Accelerator Encl. 2 Failure | 0 | 0 | 0 | 0 | 0 | 0 | 0 | 0 | 0 | 0 | 0 | 0 | 0 | 0 | 0 |
| Comp. Serv. Host 1 Failure | 0 | 0 | 0 | 0 | 0 | 0 | 0 | 0 | 0 | 0 | 0 | 0 | 0 | 0 | 0 |
| Comp. Serv. Host 2 Failure | 0 | 0 | 0 | 0 | 0 | 0 | 0 | 0 | 0 | 0 | 0 | 0 | 0 | 0 | 0 |
| Comp. Serv. Host 3 Failure | 0 | 0 | 0 | 0 | 0 | 0 | 0 | 0 | 0 | 0 | 0 | 0 | 0 | 0 | 1 |

Virtual Objects

FIG. 2D

Example Master Fault Matrix 208

Virtual Objects

| Possible Failure Events | SN 1.1 | SN 1.2 | SN 2.1 | SN 3.1 | MN 1.1 | MN 2.1 | MN 2.2 | MN 3.1 | AN 1.1 | AN 2.1 | AN 3.1 | AN 3.2 | CS 1 | CS 2 | CS 3 |
|---|---|---|---|---|---|---|---|---|---|---|---|---|---|---|---|
| Storage Dev. 1.1 Failure | 1 | 0 | 0 | 0 | 0 | 0 | 0 | 0 | 0 | 0 | 0 | 0 | 0 | 0 | 0 |
| Storage Dev. 1.2 Failure | 0 | 1 | 0 | 1 | 0 | 0 | 0 | 0 | 0 | 0 | 0 | 0 | 0 | 0 | 0 |
| Storage Dev. 2.1 Failure | 0 | 0 | 1 | 0 | 0 | 0 | 0 | 0 | 0 | 0 | 0 | 0 | 0 | 0 | 0 |
| Memory Dev. 1.1 Failure | 0 | 0 | 0 | 0 | 1 | 0 | 0 | 1 | 0 | 0 | 0 | 0 | 0 | 0 | 0 |
| Memory Dev. 2.1 Failure | 0 | 0 | 0 | 0 | 0 | 1 | 1 | 0 | 0 | 0 | 0 | 0 | 0 | 0 | 0 |
| Memory Dev. 2.2 Failure | 0 | 0 | 0 | 0 | 0 | 0 | 0 | 0 | 0 | 0 | 0 | 0 | 0 | 0 | 0 |
| Accelerator Dev. 1.1 Failure | 0 | 0 | 0 | 0 | 0 | 0 | 0 | 0 | 1 | 0 | 0 | 0 | 0 | 0 | 0 |
| Accelerator Dev. 1.2 Failure | 0 | 0 | 0 | 0 | 0 | 0 | 0 | 0 | 0 | 0 | 1 | 1 | 0 | 0 | 0 |
| Accelerator Dev. 2.1 Failure | 0 | 0 | 0 | 0 | 0 | 0 | 0 | 0 | 0 | 1 | 0 | 0 | 0 | 0 | 0 |
| Storage Encl. 1 Failure | 1 | 1 | 0 | 1 | 0 | 0 | 0 | 0 | 0 | 0 | 0 | 0 | 1 | 0 | 0 |
| Storage Encl. 2 Failure | 0 | 0 | 1 | 0 | 0 | 0 | 0 | 0 | 0 | 0 | 0 | 0 | 0 | 1 | 1 |
| Memory Encl. 1 Failure | 0 | 0 | 0 | 0 | 1 | 1 | 1 | 0 | 0 | 0 | 0 | 0 | 1 | 0 | 0 |
| Memory Encl. 2 Failure | 0 | 0 | 0 | 0 | 0 | 0 | 0 | 1 | 0 | 0 | 0 | 0 | 0 | 1 | 1 |
| Accelerator Encl. 1 Failure | 0 | 0 | 0 | 0 | 0 | 0 | 0 | 0 | 1 | 1 | 0 | 0 | 1 | 0 | 0 |
| Accelerator Encl. 2 Failure | 0 | 0 | 0 | 0 | 0 | 0 | 0 | 0 | 0 | 0 | 1 | 1 | 0 | 1 | 1 |
| Comp. Serv. Host 1 Failure | 0 | 0 | 0 | 0 | 0 | 0 | 0 | 0 | 0 | 0 | 0 | 0 | 1 | 0 | 0 |
| Comp. Serv. Host 2 Failure | 0 | 0 | 0 | 0 | 0 | 0 | 0 | 0 | 0 | 0 | 0 | 0 | 0 | 1 | 0 |
| Comp. Serv. Host 3 Failure | 0 | 0 | 0 | 0 | 0 | 0 | 0 | 0 | 0 | 0 | 0 | 0 | 0 | 0 | 1 |

*FIG. 2E*

FAULT ISOLATION FOR COMPOSED SERVICES

BACKGROUND

Within traditional clustered infrastructure, which relies heavily on physical network servers, fault domains tend to be well defined. That is, when a physical network server fails, the local resources (e.g., storage, memory, networking, etc.), provided thereon, often fail together.

SUMMARY

In general, in one aspect, embodiments described herein relate to a method for processing service fault assessment requests. The method includes: receiving a service fault assessment request concerning a new composed service; making a determination that the new composed service is already configured; based on the determination: building a service fault matrix for the new composed service; obtaining a cluster fault matrix for a composed service cluster to which the new composed service belongs; making a second determination, based on a search performed using the service fault matrix and the cluster fault matrix, that an overlapping composable resource has been identified; based on the second determination: generating a service fault assessment report including identification metadata associated with the overlapping composable resource; and providing the service fault assessment report in response to the service fault assessment request.

In general, in one aspect, embodiments described herein relate to a non-transitory computer readable medium. The non-transitory computer readable medium includes computer readable program code, which when executed by a computer processor, enables the computer processor to perform a method for processing service fault assessment requests. The method includes: receiving a service fault assessment request concerning a new composed service; making a determination that the new composed service is already configured; based on the determination: building a service fault matrix for the new composed service; obtaining a cluster fault matrix for a composed service cluster to which the new composed service belongs; making a second determination, based on a search performed using the service fault matrix and the cluster fault matrix, that an overlapping composable resource has been identified; based on the second determination: generating a service fault assessment report including identification metadata associated with the overlapping composable resource; and providing the service fault assessment report in response to the service fault assessment request.

In general, in one aspect, embodiments described herein relate to a system. The system includes: an admin device; and a fault isolation assessor operatively connected to the admin device, and including a computer processor configured to perform a method for processing service fault assessment requests. The method includes: receiving, from the admin device, a service fault assessment request concerning a new composed service; making a determination that the new composed service is already configured; based on the determination: building a service fault matrix for the new composed service; obtaining a cluster fault matrix for a composed service cluster to which the new composed service belongs; making a second determination, based on a search performed using the service fault matrix and the cluster fault matrix, that an overlapping composable resource has been identified; based on the second determination: generating a service fault assessment report including identification metadata associated with the overlapping composable resource; and providing, to the admin device, the service fault assessment report in response to the service fault assessment request.

Other aspects of the invention will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 2A shows an example service fault matrix in accordance with one or more embodiments described herein.

FIG. 2B shows an example service fault matrix in accordance with one or more embodiments described herein.

FIG. 2C shows an example cluster fault matrix in accordance with one or more embodiments described herein.

FIG. 2D shows an example cluster fault matrix in accordance with one or more embodiments described herein.

FIG. 2E shows an example master fault matrix in accordance with one or more embodiments described herein.

DETAILED DESCRIPTION

Figure 1A:
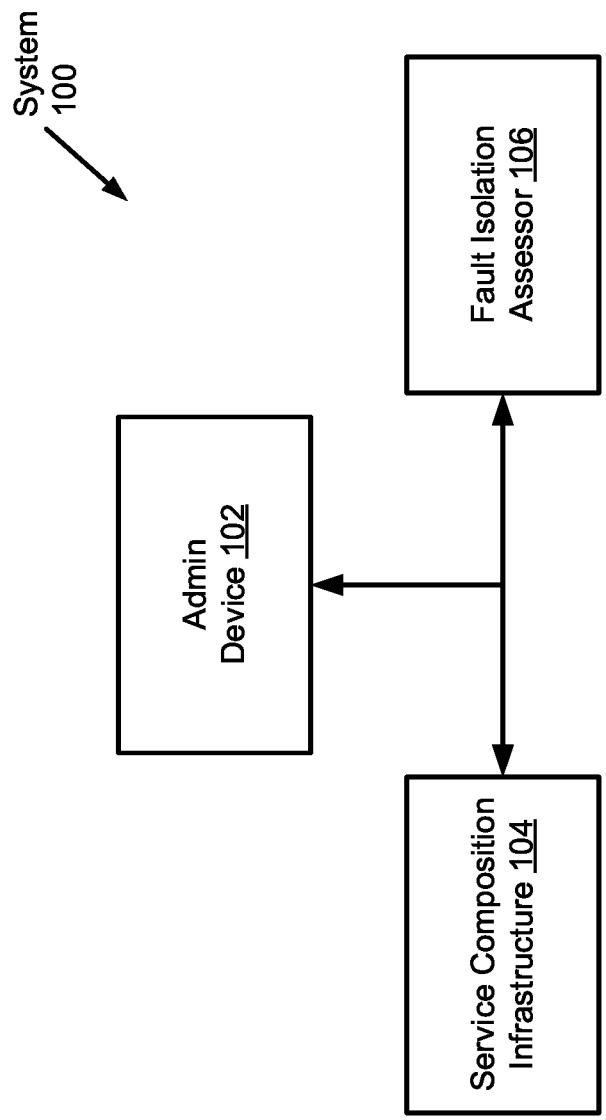
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to fault isolation for composed services. Within traditional clustered infrastructure, which relies heavily on physical network servers, fault domains tend to be well defined. That is, when a physical network server fails, the local resources (e.g., storage, memory, networking, etc.), provided thereon, often fail together. Within virtual clustered infrastructure, however, encompassing virtual network servers (also referred herein as composed services) each supported by dynamically provisioned resources from different entities over one or more network fabrics, the fault domains are no longer clearly defined. That is, the failure of a single physical resource could result in the inoperability of multiple virtual network servers.

Embodiments described herein, accordingly, implement a solution addressing the above-mentioned issue(s), and thus directed to fault isolation for composed services, by leveraging correlations between possible failure events involving physical resources and virtual objects. Particularly, the solution proposes using fault matrices, respective to composed services and/or composed service clusters, to minimize, if not eliminate, the overlapping of physical resources amongst composed services of any given composed service cluster. Through said minimization, if not elimination, the composed services may be rendered fault isolated and, subsequently, immune to failing together as a result of no longer sharing the same physical resource(s).

FIG. 1A shows a system in accordance with one or more embodiments described herein. The system (100) may include an admin device (102), a service composition infrastructure (104), and a fault isolation assessor (106). Each of these system (100) components is described below.

In one or many embodiment(s) described herein, the admin device (102) may represent any physical appliance or computing system operated by one or many administrator(s) of system (100). An administrator may refer to an individual or entity whom may be responsible for overseeing system (100) operations and maintenance. To that extent, the admin device (100) may include functionality to: configure (or control) and update the service composition infrastructure (104), as well as the fault isolation assessor (106); submit service fault assessment requests (see e.g., FIG. 3A) to the fault isolation assessor (106) for processing; and receive reports from the fault isolation assessor (106) in response to the processing of service fault assessment requests and/or failure event notices (see e.g., FIG. 4A). One of ordinary skill, however, will appreciate that the admin device (102) may perform other functionalities without departing from the scope of the embodiments described herein. Examples of the admin device (102) may include, but may not be limited to, a desktop computer, a laptop computer, a network server, a network mainframe, a smartphone, a tablet computer, or any other computing system similar to the exemplary computing system illustrated and described with respect to FIG. 5, below.

In one or many embodiment(s) described herein, the service composition infrastructure (104) The service composition infrastructure (104) may represent any enterprise information technology (IT) infrastructure at least configured to function as a service delivery platform. To that extent, the service composition infrastructure (104) may include functionality to: create, delete, configure, and deploy services; manage and provision both physical and virtual resources as needed to support the operation of deployed services; and submit service fault assessment requests and/or failure event notices (described below) to the fault isolation assessor (106) for processing. One of ordinary skill, however, will appreciate that the service composition infrastructure (104) may perform other functionalities without departing from the scope of the embodiments described herein.

In one or many embodiment(s) described herein, the service composition infrastructure (104) may be implemented through on-premises infrastructure, cloud computing infrastructure, or any hybrid infrastructure thereof. The service composition infrastructure (104), accordingly, may be implemented using one or more network servers, where each network server may represent a physical or a virtual network server. Additionally, or alternatively, the service composition infrastructure (104) may be implemented using one or more computing systems similar to the exemplary computing system illustrated and described with respect to FIG. 5, below. The service composition infrastructure (104) is illustrated and described in further detail below with respect to FIG. 1B.

In one or many embodiment(s) described herein, the fault isolation assessor (106) may represent any enterprise IT infrastructure at least configured to maximize fault isolation amongst services deployed on/by the service composition infrastructure (104). To that extent, the fault isolation assessor (106) may include functionality to: receive and process service fault assessment requests-a method illustrated and described with respect to FIGS. 3A-3E, below; and receive and process failure event notices-a method illustrated and described with respect to FIGS. 4A-4E, below. One of ordinary skill, however, will appreciate that the fault isolation assessor (106) may perform other functionalities without departing from the scope of the embodiments described herein.

In one or many embodiment(s) described herein, the fault isolation assessor (106) may be implemented through on-premises infrastructure, cloud computing infrastructure, or any hybrid infrastructure thereof. The fault isolation assessor (106), accordingly, may be implemented using one or more network servers, where each network server may represent a physical or a virtual network server. Additionally, or alternatively, the fault isolation assessor (106) may be implemented using one or more computing systems similar to the exemplary computing system illustrated and described with respect to FIG. 5, below.

In one or many embodiment(s) described herein, the above-mentioned system (100) components (or subcomponents thereof) may communicate with one another through one or more networks (not shown) (e.g., a local area network (LAN), a wide area network (WAN) such as the Internet, a mobile network, any other network type (e.g., a compute express link (CXL) network, an InfiniBand network, etc.), or any combination thereof). The network(s) may be implemented using any combination of wired and/or wireless connections. Further, the network(s) may encompass various interconnected, network-enabled subcomponents (or systems) (e.g., switches, routers, gateways, etc.) that may facilitate communications between the above-mentioned system (100) components (or subcomponents thereof). Moreover, in communicating with one another, the above-mentioned system (100) components (or subcomponents thereof) may employ any combination of wired and/or wireless communication protocols.

While FIG. 1A shows a configuration of components and/or subcomponents, other system (100) configurations may be used without departing from the scope of the embodiments described herein.

For example, in one or many other embodiment(s) described herein, instead of operating as a standalone component (as is depicted in FIG. 1A), the fault isolation assessor (106) may operate as a subcomponent of the service composition infrastructure (104). In said other embodiment(s), the fault isolation assessor (106) may perform substantially the same functionalities described above with respect to the standalone counterpart. Further, as a subcomponent of the service composition infrastructure (104), the fault isolation assessor (106) may instead represent instruction-processing hardware (e.g., any number of integrated circuits for processing computer readable instructions) installed within the service composition infrastructure (104), a computer program executing on the underlying hardware of the service composition infrastructure (104), or any combination thereof, at least configured to maximize fault isolation amongst services deployed on/by the service composition infrastructure (104).

Figure 1B:
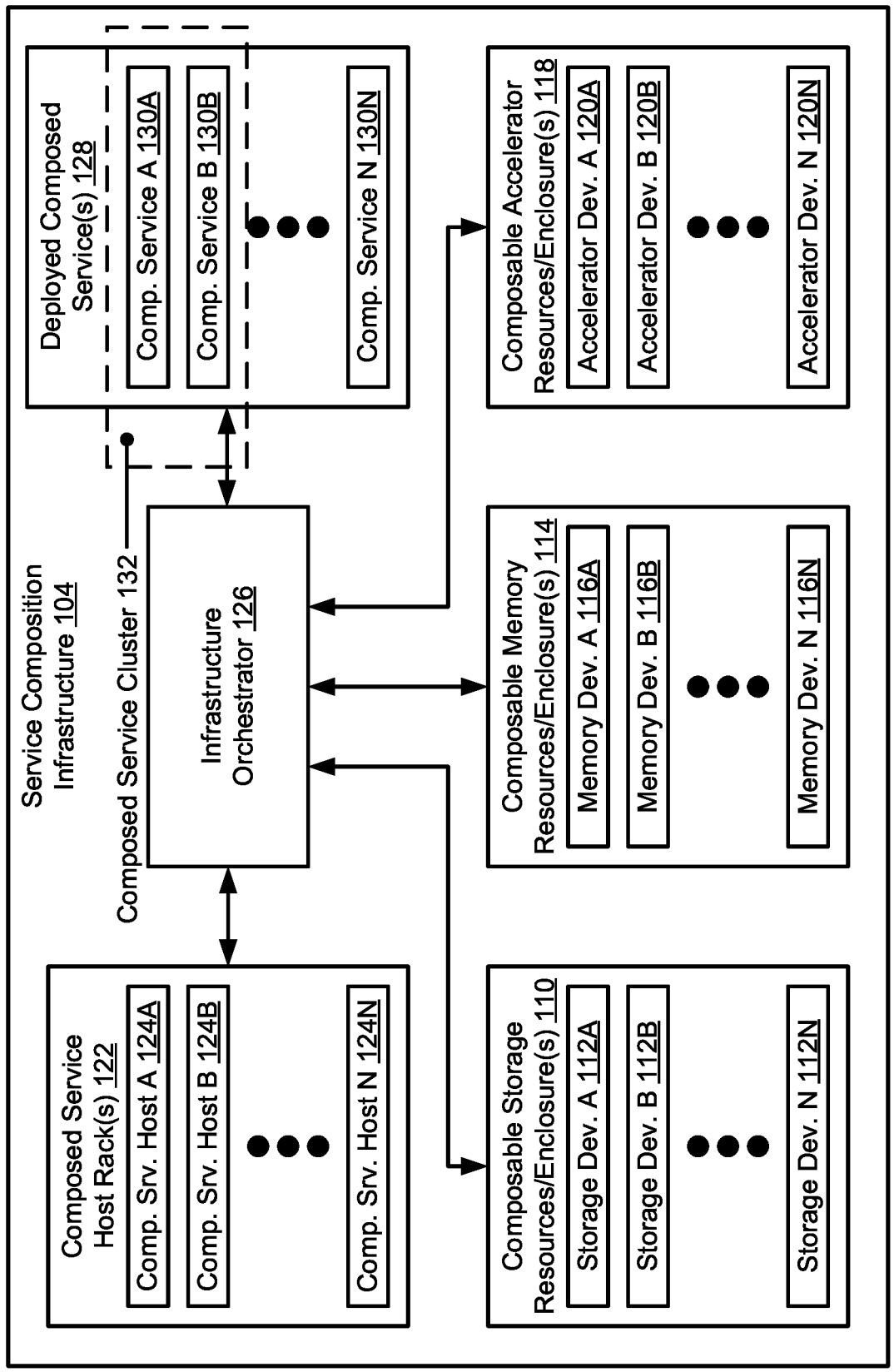
FIG. 1B shows a service composition infrastructure in accordance with one or more embodiments described herein.

FIG. 1B shows a service composition infrastructure in accordance with one or more embodiments described herein, the service composition infrastructure (104) may include composable storage resources (110), composable memory resources (114), composable accelerator resources (118), one or more composed service host racks (122), an infrastructure orchestrator (126), and one or more deployed composed services (128). Each of these service composition infrastructure (104) components is described below.

In one or many embodiment(s) described herein, the composable storage resources (110) may represent disaggregated storage, or scalable enterprise storage resources that form a logical storage pool. The logical storage pool, and thus the composable storage resources (110), may be implemented through the connection or combination of one or more physical storage devices (112A-112N) over a network fabric. Further, any granularity of the composable storage resources (110) may be dynamically provisioned or de-provisioned to any of the deployed composed service(s) (128) based at least on the workload(s) executed by said any of the deployed composed service(s) (128). Any dynamically provisioned granularity of the composable storage resources (110) may be presented and accessed as a storage namespace (not shown) (or at least a namespace partition thereof). Any given storage namespace may refer to a logically separated, individually addressable subset of the logical storage pool that may span, in whole or in part, on/across one or more physical storage devices (112A-112N).

In one or many embodiment(s) described herein, each physical storage device (112A-112N) may encompass non-transitory computer readable storage media on which various forms of digital information (e.g., structured and unstructured data) may be stored in whole or in part, and temporarily or permanently. Examples of non-transitory computer readable storage media may include, but may not be limited to, optical storage (e.g., compact discs (CDs) and digital versatile discs (DVDs)), magnetic storage (e.g., magnetic tapes, floppy disks, and hard disk drives (HDDs)), and solid state storage (e.g., solid state drives (SSDs), thumb drives, and secure digital (SD) cards).

In one or many embodiment(s) described herein, the one or more physical storage devices (112A-112N) may be physically housed together within one or more enclosures (also referred herein as composable storage enclosures). Any composable storage enclosure, therefore, may include: one or more physical storage devices (112A-112N); a network fabric (or a portion thereof) interconnecting the one or more physical storage devices (112A-112N) therein to each other as well as to at least the infrastructure orchestrator (126); and at least one power supply configured to provide electrical power to the one or more physical storage devices (112A-112N) therein. One of ordinary skill will appreciate, however, that any composable storage enclosure may include additional subcomponents without departing from the scope of the embodiments described herein.

In one or many embodiment(s) described herein, the composable memory resources (114) may represent disaggregated memory, or scalable enterprise memory resources that form a logical memory pool. The logical memory pool, and thus the composable memory resources (113), may be implemented through the connection or combination of one or more physical memory devices (116A-116N) over a network fabric. Further, any granularity of the composable memory resources (114) may be dynamically provisioned or de-provisioned to any of the deployed composed service(s) (128) based at least on the workload(s) executed by said any of the deployed composed service(s) (128). Any dynamically provisioned granularity of the composable memory resources (114) may be presented and accessed as a memory namespace (not shown) (or at least a namespace partition thereof). Any given memory namespace may refer to a logically separated, individually addressable subset of the logical memory pool that may span, in whole or in part, on/across one or more physical memory devices (116A-116N).

In one or many embodiment(s) described herein, each physical memory device (116A-116N) may encompass non-transitory computer readable memory media on which various forms of digital information (e.g., structured and unstructured data) may be stored in whole or in part, and temporarily or permanently. Examples of non-transitory computer readable memory media may include, but may not be limited to, volatile memory (e.g., static random access memory (SRAM), dynamic random access memory (DRAM), and synchronous dynamic random access memory (SDRAM)) and non-volatile memory (e.g., read-only memory (ROM) and flash memory).

In one or many embodiment(s) described herein, the one or more physical memory devices (116A-116N) may be physically housed together within one or more enclosures (also referred herein as composable memory enclosures). Any composable memory enclosure, therefore, may include: one or more physical memory devices (116A-116N); a network fabric (or a portion thereof) interconnecting the one or more physical memory devices (116A-116N) therein to each other as well as to at least the infrastructure orchestrator (128); and at least one power supply configured to provide electrical power to the one or more physical memory devices (116A-116N) therein. One of ordinary skill will appreciate, however, that any composable memory enclosure may include additional subcomponents without departing from the scope of the embodiments described herein.

In one or many embodiment(s) described herein, the composable accelerator resources (118) may represent disaggregated accelerated computing, or scalable enterprise accelerator resources that form a logical accelerator pool. The logical accelerator pool, and thus the composable accelerator resources (118), may be implemented through the connection or combination of one or more physical accelerator devices (120A-120N) over a network fabric. Further, any granularity of the composable accelerator resources (118) may be dynamically provisioned or de-provisioned to any of the deployed composed service(s) (128) based at least on the workload(s) executed by said any of the deployed composed service(s) (128). Any dynamically provisioned granularity of the composable accelerator resources (118) may be presented and accessed as an accelerator namespace (not shown) (or at least a namespace partition thereof). Any given accelerator namespace may refer to a logically separated, individually addressable subset of the logical accelerator pool that may span, in whole or in part, on/across one or more physical accelerator devices (120A-120N).

In one or many embodiment(s) described herein, each physical accelerator device (120A-120N) may encompass specialized hardware configured to speed up demanding workloads through the use of parallel processing. Examples of said specialized hardware may include, but may not be limited to, a graphics processing unit (GPU), a data processing unit (DPU), a tensor processing unit (TPU), and a vision processing unit (VPU).

In one or many embodiment(s) described herein, the one or more physical accelerator devices (120A-120N) may be physically housed together within one or more enclosures (also referred herein as composable accelerator enclosures). Any composable accelerator enclosure, therefore, may include: one or more physical accelerator devices (120A-120N); a network fabric (or a portion thereof) interconnecting the physical accelerator devices (120A-120N) therein to each other as well as to at least the infrastructure orchestrator (126); and at least one power supply configured to provide electrical power to the one or more physical accelerator devices (120A-120N) therein. One of ordinary skill will appreciate, however, that any composable accelerator enclosure may include additional subcomponents without departing from the scope of the embodiments described herein.

In one or many embodiment(s) described herein, any composed service host rack (122) may represent a physical framework or structure configured to at least house multiple physical network servers (referred to herein as composable service hosts (124A-124N)). Each composable service host (124A-124N), therefore, may refer to any physical network server at least configured to provide an environment in which one or more composed services (described below) may be deployed and execute thereon. Further, in providing said environment for any composed service(s) deployed thereon, each composable service host (124A-124N) may include and allocate various local resources (e.g., compute, memory, virtualization, and networking), as needed, to the composed service(s) and/or the tasks (or workloads) instantiated thereby. An example composed service host (124A-124N) with a deployed composed service is illustrated and described in further detail with respect to FIG. 1C, below.

In one or many embodiment(s) described herein, the infrastructure orchestrator (126) may represent instruction-processing hardware (e.g., any number of integrated circuits for processing computer readable instructions), a computer program executing on the underlying hardware of the service composition infrastructure (104), or any combination thereof, at least configured to oversee and/or manage service composition infrastructure (104) operations. To that extent, the infrastructure orchestrator (126) may include functionality to: submit service fault assessment requests (see e.g., FIG. 3A) and/or failure event notices (see e.g., FIG. 4A) to the fault isolation assessor (see e.g., FIG. 1A) for processing. One of ordinary skill, however, will appreciate that the infrastructure orchestrator (126) may perform other functionalities without departing from the scope of the embodiments described herein.

In one or many embodiment(s) described herein, the deployed composed service(s) (128) may represent one or more composed services (130A-130N) that has/have been configured and, subsequently, deployed on any of the composable service host(s) (124A-124N). Any composable service (130A-130N), in turn, may refer to a virtual network server (e.g., a virtual machine or a container configured to emulate a physical network server) whereon a guest operating system and/or any number of workloads (e.g., applications) may execute. Further, any composable service (130A-130N), deployed on any composable service host (124A-124N), may have access to local resources physically installed in said any composable service host (124A-124N) and to remote resources (e.g., at least one of composable storage resources (110), composable memory resources (114), and composable accelerator resources (118)) logically provisioned via corresponding namespaces.

In one or many embodiment(s) described herein, the deployed composed service(s) (128) may be grouped into one or more composed service clusters (132). That is, any composed service cluster (132) may refer to a collection of zero or more composed services (130A-130N) that may be grouped together based on one or more criteria (e.g., execution of similar workloads, having similar resource requirements, employed by a same tenant or customer, etc.).

In one or many embodiment(s) described herein, the above-mentioned service composition infrastructure (104) components (or subcomponents thereof) may communicate with one another through one or more networks (not shown) (e.g., a local area network (LAN), a wide area network (WAN) such as the Internet, a mobile network, any other network type (e.g., a compute express link (CXL) network, an InfiniBand network, etc.), or any combination thereof). The network(s) may be implemented using any combination of wired and/or wireless connections. Further, the network(s) may encompass various interconnected, network-enabled subcomponents (or systems) (e.g., switches, routers, gateways, etc.) that may facilitate communications between the above-mentioned service composition infrastructure (104) components (or subcomponents thereof). Moreover, in communicating with one another, the above-mentioned service composition infrastructure (104) components (or subcomponents thereof) may employ any combination of wired and/or wireless communication protocols.

While FIG. 1B shows a configuration of components and/or subcomponents, other service composition infrastructure (104) configurations may be used without departing from the scope of the embodiments described herein.

Figure 1C:
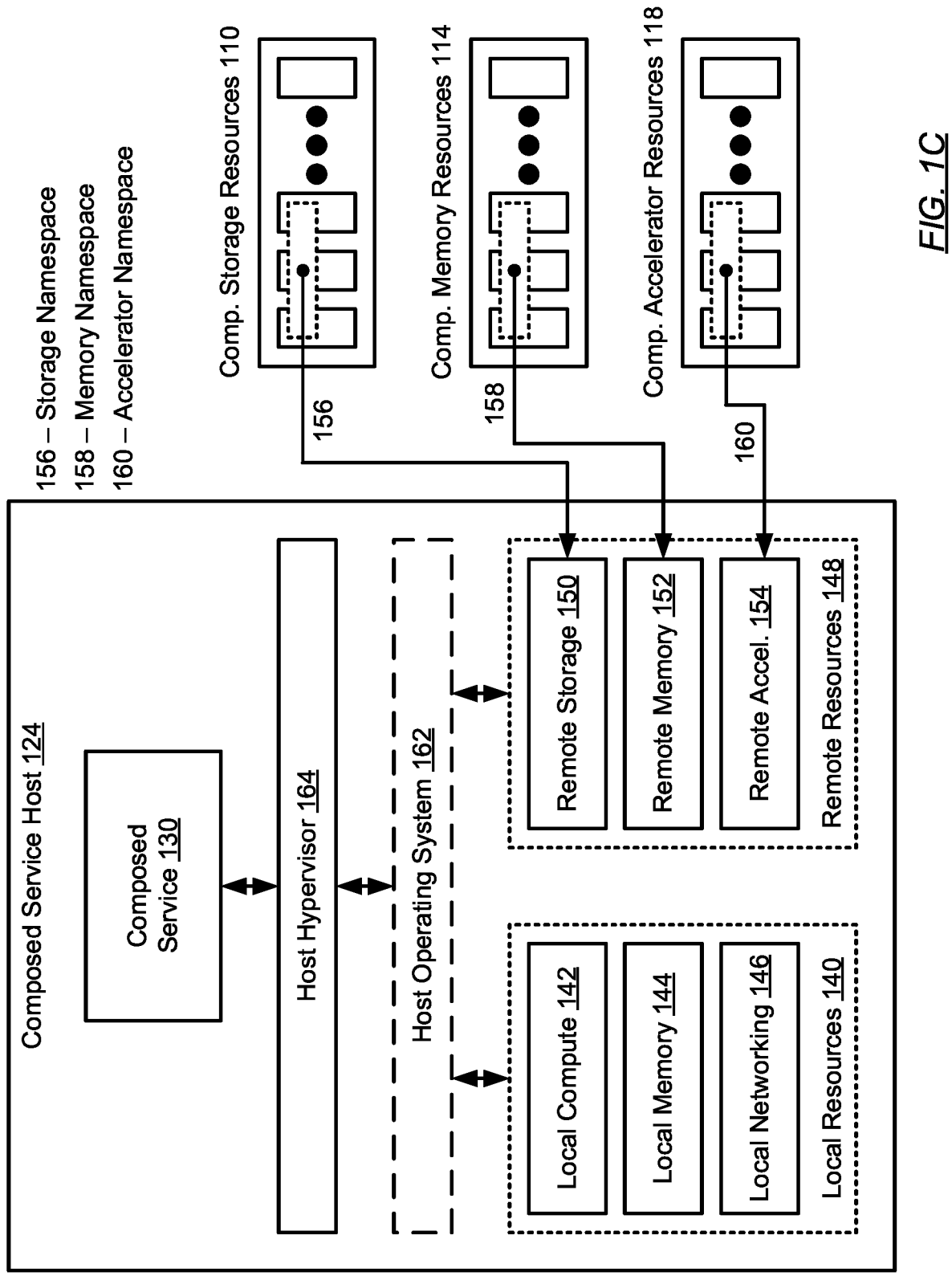
FIG. 1C shows a composed service deployed on a composed service host in accordance with one or more embodiments described herein.

FIG. 1C shows a composed service deployed on a composed service host in accordance with one or more embodiments described herein. The composed service host (124) may include local resources (140), remote resources (148), an optional host operating system (162), a host hypervisor (164), and the composed service (130) deployed thereon. Each of these composed service host (124) components is described below.

In one or many embodiment(s) described herein, any local resource (140) may refer to a physical resource natively available to, or physically installed on, the composed service host (124). The local resources (140) may include local compute (142), local memory (144), and local networking (146). The local compute (142) may encompass any number of integrated circuits for processing computer readable instructions (e.g., central processing unit(s) (CPU) also referred herein to as computer processors). The local memory (144) may encompass any number of non-volatile and/or volatile memory devices. The local networking (146) may encompass any number of integrated circuits for receiving and transmitting data over any number of networks (e.g., network adapter(s), network interface(s), etc.).

In one or many embodiment(s) described herein, any remote resource (148) may refer to a virtual resource abstracted from physical resources of the same resource type, where said physical resources reside external to any/the composed service host (116) yet remain operatively connected thereto via one or more networks. The remote resources (148) may include remote storage (150), remote memory (152), and/or remote acceleration (also referred to herein as remote accelerated computing) (154).

In one or many embodiment(s) described herein, the remote storage (150) may encompass virtual storage provisioned to the composed service host (124) or, more specifically, to the composed service (130) deployed thereon. The remote storage (150) may be backed by or abstracted from at least a subset of at least one physical storage device—each in whole or in part—which, through interconnection or combination, form a logical storage pool referred to herein as composable storage resources (110) (see e.g., FIG. 1B). Further, the remote storage (150) may be provisioned through, using, or as a storage namespace (156). The storage namespace (156) may represent a logically separated, individually addressable subset (or portion) of the logical storage pool, where said logical storage pool subset/portion may span, in whole or in part, on/across one or more of the aforementioned at least one physical storage device. The storage namespace (156), moreover, may be assigned, or associated with, a (storage) namespace identifier (ID) representing any arbitrary length character string that uniquely identifies, as well as allows discovery of and access to, the storage namespace (156).

In one or many embodiment(s) described herein, the remote memory (152) may encompass virtual memory provisioned to the composed service host (124) or, more specifically, to the composed service (130) deployed thereon. The remote memory (152) may be backed by or abstracted from at least a subset of at least one physical memory device—each in whole or in part—which, through interconnection or combination, form a logical memory pool referred to herein as composable memory resources (114) (see e.g., FIG. 1B). Further, the remote memory (152) may be provisioned through, using, or as a memory namespace (158). The memory namespace (158) may represent a logically separated, individually addressable subset (or portion) of the logical memory pool, where said logical memory pool subset/portion may span, in whole or in part, on/across one or more of the aforementioned at least one physical memory device. The memory namespace (158), moreover, may be assigned, or associated with, a (memory) namespace identifier (ID) representing any arbitrary length character string that uniquely identifies, as well as allows discovery of and access to, the memory namespace (158).

In one or many embodiment(s) described herein, the remote accelerated computing (154) may encompass virtual accelerated computing provisioned to the composed service host (124) or, more specifically, to the composed service (130) deployed thereon. The remote accelerated computing (154) may be backed by or abstracted from at least a subset of at least one physical accelerator device—each in whole or in part—which, through interconnection or combination, form a logical accelerator pool referred to herein as composable accelerator resources (118) (see e.g., FIG. 1B). Further, the remote accelerated computing (154) may be provisioned through, using, or as an accelerator namespace (160). The accelerator namespace (160) may represent a logically separated, individually addressable subset (or portion) of the logical accelerator pool, where said logical accelerator pool subset/portion may span, in whole or in part, on/across one or more of the aforementioned at least one physical accelerator device. The accelerator namespace (160), moreover, may be assigned, or associated with, a/an (accelerator) namespace identifier (ID) representing any arbitrary length character string that uniquely identifies, as well as allows discovery of and access to, the accelerator namespace (160).

In one or many embodiment(s) described herein, the (optional) host operating system (162) may refer to a computer program that may execute on the underlying hardware of the composed service host (124), which may be responsible for overseeing composed service host (124) operations. To that extent, and at least in part, the (optional) host operating system (162) may include functionality to: support fundamental composed service host (124) functions; schedule tasks; mediate interactivity between logical (e.g., software) and physical (e.g., hardware) composed service host (124) components; allocate the local resources (140) and/or the remote sources (148) as needed; and execute or invoke other computer program(s) (e.g., host hypervisor (164)) executing on the composed service host (124). One of ordinary skill, however, will appreciate that the (optional) host operating system (162) may perform other functionalities without departing from the scope of the embodiments described herein.

In one or many embodiment(s) described herein, the host hypervisor (164) may refer to a computer program that may execute on the underlying hardware of the composed service host (124), which may be responsible for managing virtualization resources (e.g., virtual machines and/or containers, such as the composed service (130)) deployed on the composed service host (124). To that extent, and at least in part, the host hypervisor (168) may include functionality to: allocate and de-allocate any granularity of the local resources (140) and/or the remote resources (148) as needed to support the operation of the composed service (122) (either through interfacing with the host operating system (162) if installed or through interfacing with said resources (140, 148) if the host operating system (162) is not installed). One of ordinary skill, however, will appreciate that the host hypervisor (164) may perform other functionalities without departing from the scope of the embodiments described herein.

In one or many embodiment(s) described herein, the composed service (130) (see e.g., FIG. 1B) may refer to a virtual network server (e.g., a virtual machine or a container configured to emulate a physical network server) whereon a guest operating system and/or any number of workloads (e.g., applications) may execute. When resources (e.g., any granularity of the local resources (140) and/or the remote resources (148)) may be needed to support the workload(s) tasked to execute, the composed service (130) may include functionality to: communicate or request said needed resources to the host hypervisor (164) and, subsequently, receive access to said needed resources therefrom. One of ordinary skill, however, will appreciate that the composed service (130) may perform other functionalities without departing from the scope of the embodiments described herein.

While FIG. 1B shows a configuration of components and/or subcomponents, other composed service host (124) configurations may be used without departing from the scope of the embodiments described herein.

FIG. 2A shows an example service fault matrix in accordance with one or more embodiments described herein. The example service fault matrix [N, M] (200) may represent any data structure that may be arranged using any number of rows N and any number of columns M. The rows N each reflect a possible failure event that could befall a physical (i.e., hardware) component (also referred to herein as a physical infrastructure component) of the service composition infrastructure (see e.g., FIG. 1B). Examples of said physical infrastructure component may include: a storage device, a memory device, an accelerator device, a composable storage enclosure, a composable memory enclosure, a composable accelerator enclosure, and a composed service host.

The columns M, meanwhile, each reflect a virtual object supported by any one or more physical infrastructure component(s). Examples of said virtual object may include: a storage namespace (SN) (or a storage namespace partition thereof), a memory namespace (MN) (or a memory namespace partition thereof), an accelerator namespace (AN) (or an accelerator namespace partition thereof), and a composed service (CS). The example service fault matrix (200), accordingly, conveys the correlation between possible failure events and virtual objects-both with respect (or related) to a given composed service deployed on/by the service composition infrastructure.

Any element (n, m) of the example service fault matrix [N, M] (200) thus maps to a given possible failure event and a given virtual object; and stores or reflects a numerical value that measures the correlation between said given possible failure event and said given virtual object. The numerical value, further, may express a zero (0) value indicating no or a low correlation, or may express a one (1) value indicating a high correlation. As such, any element (n, m), storing/reflecting a zero (0) value, may indicate that an occurrence of the given possible failure event (i.e., corresponding to row n of N) (mapped to said element) has little or no impact on the given virtual object (i.e., corresponding to column m of M) (also mapped to said element). Conversely, any element (n, m), storing/reflecting a one (1) value, may indicate that an occurrence of the given possible failure event (i.e., corresponding to row n of N) (mapped to said element) has a high impact on the given virtual object (i.e., corresponding to the column m of M) (also mapped to said element).

The example service fault matrix [N, M] (200), depicted herein, pertains to a first composed service (CS1). Looking at the example service fault matrix [N, M] (200), CS1 uses a first storage namespace partition (SN1.1) of a first storage namespace (SN1), a second storage namespace partition (SN1.2) of SN1, a first memory namespace partition (MN1.1) of a first memory namespace (MN1), and a first accelerator namespace partition (AN1.1) of a first accelerator namespace (AN1).

Furthermore, based on the example service fault matrix [N, M] (200), SN1.1 is implemented on a first storage device (Storage Dev. 1.1) of a first composable storage enclosure (Storage Encl. 1), SN1.2 is implemented on a second storage device (Storage Dev. 1.2) of Storage Encl. 1, MN1.1 is implement on a first memory device (Memory Dev. 1.1) of a first composable memory enclosure (Memory Encl. 1), AN1.1 is implemented on a first accelerator device (Accelerator Dev. 1.1) of a first composable accelerator enclosure (Accelerator Encl. 1), and CS1 is implemented on a first composed service host (Comp. Serv. Host 1).

The failure of a device (e.g., Storage Dev. 1.1, Storage Dev. 1.2, Memory Dev. 1.1, or Accelerator Dev. 1.1), based on a respective element (n, m) storing/reflecting a one (1) value, will impact an implementation and/or operability of a virtual object (e.g., SN1.1, SN1.2, MN1.1, or AN1.1) mapped thereto.

The failure of a composable enclosure (e.g., Storage Encl. 1, Memory Encl. 1, or Accelerator Encl. 1), based on a respective element (n, m) storing/reflecting a one (1) value, will impact an implementation and/or operability of not only a virtual object (e.g., SN1.1 & SN1.2, MN1.1, or AN1.1) mapped thereto, but also a composed service (e.g., CS1) using the composable enclosure.

The failure of a composed service host (e.g., Comp. Serv. 1), based on a respective element (n, m) storing/reflecting a one (1) value, will impact a composed service (e.g., CS1) mapped thereto or deployed thereon.

FIG. 2B shows an example service fault matrix in accordance with one or more embodiments described herein. The example service fault matrix [N, M] (200) may represent any data structure that may be arranged using any number of rows N and any number of columns M. The rows N each reflect a possible failure event that could befall a physical (i.e., hardware) component (also referred to herein as a physical infrastructure component) of the service composition infrastructure (see e.g., FIG. 1B). Examples of said physical infrastructure component may include: a storage device, a memory device, an accelerator device, a composable storage enclosure, a composable memory enclosure, a composable accelerator enclosure, and a composed service host.

The columns M, meanwhile, each reflect a virtual object supported by any one or more physical infrastructure component(s). Examples of said virtual object may include: a storage namespace (SN) (or a storage namespace partition thereof), a memory namespace (MN) (or a memory namespace partition thereof), an accelerator namespace (AN) (or an accelerator namespace partition thereof), and a composed service (CS). The example service fault matrix (202), accordingly, conveys the correlation between possible failure events and virtual objects-both with respect (or related) to a given composed service deployed on/by the service composition infrastructure.

Any element (n, m) of the example service fault matrix [N, M] (202) thus maps to a given possible failure event and a given virtual object; and stores or reflects a numerical value that measures the correlation between said given possible failure event and said given virtual object. The numerical value, further, may express a zero (0) value indicating no or a low correlation, or may express a one (1) value indicating a high correlation. As such, any element (n, m), storing/reflecting a zero (0) value, may indicate that an occurrence of the given possible failure event (i.e., corresponding to row n of N) (mapped to said element) has little or no impact on the given virtual object (i.e., corresponding to column m of M) (also mapped to said element). Conversely, any element (n, m), storing/reflecting a one (1) value, may indicate that an occurrence of the given possible failure event (i.e., corresponding to row n of N) (mapped to said element) has a high impact on the given virtual object (i.e., corresponding to the column m of M) (also mapped to said element).

The example service fault matrix [N, M] (202), depicted herein, pertains to a second composed service (CS2). Looking at the example service fault matrix [N, M] (202), CS2 uses a first storage namespace partition (SN2.1) of a second storage namespace (SN2), a first memory namespace partition (MN2.1) of a second memory namespace (MN2), a second memory namespace partition (MN2.2) of MN2, and a first accelerator namespace partition (AN2.1) of a second accelerator namespace (AN2).

Furthermore, based on the example service fault matrix [N, M] (202), SN2.1 is implemented on a first storage device (Storage Dev. 2.1) of a second composable storage enclosure (Storage Encl. 2), MN2.1 is implemented on a first memory device (Memory Dev. 2.1) of a second composable memory enclosure (Memory Encl. 2), MN2.2 is implement on a second memory device (Memory Dev. 2.2) of Memory Encl. 2, AN2.1 is implemented on a first accelerator device (Accelerator Dev. 2.1) of a second composable accelerator enclosure (Accelerator Encl. 2), and CS2 is implemented on a second composed service host (Comp. Serv. Host 2).

The failure of a device (e.g., Storage Dev. 2.1, Memory Dev. 2.1, Memory Dev. 2.2, or Accelerator Dev. 2.1), based on a respective element (n, m) storing/reflecting a one (1) value, will impact an implementation and/or operability of a virtual object (e.g., SN2.1, MN2.1, MN2.2, or AN2.1) mapped thereto.

The failure of a composable enclosure (e.g., Storage Encl. 2, Memory Encl. 2, or Accelerator Encl. 2), based on a respective element (n, m) storing/reflecting a one (1) value, will impact an implementation and/or operability of not only a virtual object (e.g., SN2.1, MN2.1 & MN2.2, or AN2.1) mapped thereto, but also a composed service (e.g., CS2) using the composable enclosure.

The failure of a composed service host (e.g., Comp. Serv. 2), based on a respective element (n, m) storing/reflecting a one (1) value, will impact a composed service (e.g., CS2) mapped thereto or deployed thereon.

FIG. 2C shows an example cluster fault matrix in accordance with one or more embodiments described herein. The example cluster fault matrix [N, M] (204) may represent any data structure that may be arranged using any number of rows N and any number of columns M. The rows N each reflect a possible failure event that could befall a physical (i.e., hardware) component (also referred to herein as a physical infrastructure component) of the service composition infrastructure (see e.g., FIG. 1B). Examples of said physical infrastructure component may include: a storage device, a memory device, an accelerator device, a composable storage enclosure, a composable memory enclosure, a composable accelerator enclosure, and a composed service host.

The columns M, meanwhile, each reflect a virtual object supported by any one or more physical infrastructure component(s). Examples of said virtual object may include: a storage namespace (SN) (or a storage namespace partition thereof), a memory namespace (MN) (or a memory namespace partition thereof), an accelerator namespace (AN) (or an accelerator namespace partition thereof), and a composed service (CS). The example cluster fault matrix (204), accordingly, conveys the correlation between possible failure events and virtual objects-both with respect (or related) to a given composed service cluster deployed on/by the service composition infrastructure.

Any element (n, m) of the example cluster fault matrix [N, M] (204) thus maps to a given possible failure event and a given virtual object; and stores or reflects a numerical value that measures the correlation between said given possible failure event and said given virtual object. The numerical value, further, may express a zero (0) value indicating no or a low correlation, or may express a one (1) value indicating a high correlation. As such, any element (n, m), storing/reflecting a zero (0) value, may indicate that an occurrence of the given possible failure event (i.e., corresponding to row n of N) (mapped to said element) has little or no impact on the given virtual object (i.e., corresponding to column m of M) (also mapped to said element). Conversely, any element (n, m), storing/reflecting a one (1) value, may indicate that an occurrence of the given possible failure event (i.e., corresponding to row n of N) (mapped to said element) has a high impact on the given virtual object (i.e., corresponding to the column m of M) (also mapped to said element).

The example cluster fault matrix [N, M] (204), depicted herein, pertains to a first composed service cluster, which includes a first composed service (CS1) and a second composed service (CS2). Accordingly, the example cluster fault matrix [N, M] (204) reflects a union of the service fault matrix (see e.g., FIG. 2A) for CS1 and the service fault matrix (see e.g., FIG. 2B) for CS2. That is, by employing an element-wise Boolean union of (or a matrix union) of the two service fault matrices, any element (n, m) of the example cluster fault matrix [N, M] (204)=the Boolean union (U) between the same element (n, m) of the service fault matrix [N, M] (200) for CS1 and the same element (n, m) of the service fault matrix [N, M] (202) for CS2.

FIG. 2D shows an example cluster fault matrix in accordance with one or more embodiments described herein. The example cluster fault matrix [N, M] (206) may represent any data structure that may be arranged using any number of rows N and any number of columns M. The rows N each reflect a possible failure event that could befall a physical (i.e., hardware) component (also referred to herein as a physical infrastructure component) of the service composition infrastructure (see e.g., FIG. 1B). Examples of said physical infrastructure component may include: a storage device, a memory device, an accelerator device, a composable storage enclosure, a composable memory enclosure, a composable accelerator enclosure, and a composed service host.

The columns M, meanwhile, each reflect a virtual object supported by any one or more physical infrastructure component(s). Examples of said virtual object may include: a storage namespace (SN) (or a storage namespace partition thereof), a memory namespace (MN) (or a memory namespace partition thereof), an accelerator namespace (AN) (or an accelerator namespace partition thereof), and a composed service (CS). The example cluster fault matrix (206), accordingly, conveys the correlation between possible failure events and virtual objects-both with respect (or related) to a given composed service cluster deployed on/by the service composition infrastructure.

Any element (n, m) of the example cluster fault matrix [N, M] (206) thus maps to a given possible failure event and a given virtual object; and stores or reflects a numerical value that measures the correlation between said given possible failure event and said given virtual object. The numerical value, further, may express a zero (0) value indicating no or a low correlation, or may express a one (1) value indicating a high correlation. As such, any element (n, m), storing/reflecting a zero (0) value, may indicate that an occurrence of the given possible failure event (i.e., corresponding to row n of N) (mapped to said element) has little or no impact on the given virtual object (i.e., corresponding to column m of M) (also mapped to said element). Conversely, any element (n, m), storing/reflecting a one (1) value, may indicate that an occurrence of the given possible failure event (i.e., corresponding to row n of N) (mapped to said element) has a high impact on the given virtual object (i.e., corresponding to the column m of M) (also mapped to said element).

The example cluster fault matrix [N, M] (206), depicted herein, pertains to a second composed service cluster, which includes a third composed service (CS3). Accordingly, with only CS3 there-within, example cluster fault matrix [N, M] (206) is identical to a service fault matrix [N, M] (not shown) pertaining to CS3.

Looking at the example cluster fault matrix [N, M] (206), CS3 uses a first storage namespace partition (SN3.1) of a third storage namespace (SN3), a first memory namespace partition (MN3.1) of a third memory namespace (MN3), a first accelerator namespace partition (AN3.1) of a third accelerator namespace (AN3), and a second accelerator namespace partition (AN3.2) of AN3.

Furthermore, based on the example cluster fault matrix [N, M] (206), SN3.1 is implemented on a second storage device (Storage Dev. 1.2) of a first composable storage enclosure (Storage Encl. 1), MN3.1 is implemented on a first memory device (Memory Dev. 2.1) of a second composable memory enclosure (Memory Encl. 2), AN3.1 is implement on a first accelerator device (Accelerator Dev. 1.1) of a first composable accelerator enclosure (Accelerator Encl. 1), AN3.2 is implemented on a second accelerator device (Accelerator Dev. 1.2) of Accelerator Encl. 1, and CS3 is implemented on a third composed service host (Comp. Serv. Host 3).

The failure of a device (e.g., Storage Dev. 1.2, Memory Dev. 2.1, Accelerator Dev. 1.1, or Accelerator Dev. 1.2), based on a respective element (n, m) storing/reflecting a one (1) value, will impact an implementation and/or operability of a virtual object (e.g., SN3.1, MN3.1, AN3.1, or AN3.2) mapped thereto.

The failure of a composable enclosure (e.g., Storage Encl. 1, Memory Encl. 2, or Accelerator Encl. 1), based on a respective element (n, m) storing/reflecting a one (1) value, will impact an implementation and/or operability of not only a virtual object (e.g., SN3.1, MN3.1, or AN3.1 & AN3.2) mapped thereto, but also a composed service (e.g., CS3) using the composable enclosure.

The failure of a composed service host (e.g., Comp. Serv. 3), based on a respective element (n, m) storing/reflecting a one (1) value, will impact a composed service (e.g., CS3) mapped thereto or deployed thereon.

FIG. 2E shows an example master fault matrix in accordance with one or more embodiments described herein. The example master fault matrix [N, M] (208) may represent any data structure that may be arranged using any number of rows N and any number of columns M. The rows N each reflect a possible failure event that could befall a physical (i.e., hardware) component (also referred to herein as a physical infrastructure component) of the service composition infrastructure (see e.g., FIG. 1B). Examples of said physical infrastructure component may include: a storage device, a memory device, an accelerator device, a composable storage enclosure, a composable memory enclosure, a composable accelerator enclosure, and a composed service host.

The columns M, meanwhile, each reflect a virtual object supported by any one or more physical infrastructure component(s). Examples of said virtual object may include: a storage namespace (SN) (or a storage namespace partition thereof), a memory namespace (MN) (or a memory namespace partition thereof), an accelerator namespace (AN) (or an accelerator namespace partition thereof), and a composed service (CS). The example master fault matrix (208), accordingly, conveys the correlation between possible failure events and virtual objects-both with respect (or related) to the service composition infrastructure in entirety.

Any element (n, m) of the example master fault matrix [N, M] (208) thus maps to a given possible failure event and a given virtual object; and stores or reflects a numerical value that measures the correlation between said given possible failure event and said given virtual object. The numerical value, further, may express a zero (0) value indicating no or a low correlation, or may express a one (1) value indicating a high correlation. As such, any element (n, m), storing/reflecting a zero (0) value, may indicate that an occurrence of the given possible failure event (i.e., corresponding to row n of N) (mapped to said element) has little or no impact on the given virtual object (i.e., corresponding to column m of M) (also mapped to said element). Conversely, any element (n, m), storing/reflecting a one (1) value, may indicate that an occurrence of the given possible failure event (i.e., corresponding to row n of N) (mapped to said element) has a high impact on the given virtual object (i.e., corresponding to the column m of M) (also mapped to said element).

The example master fault matrix [N, M] (208), depicted herein, pertains to the service composition infrastructure in entirety, which includes a first composed service cluster and a second composed service cluster. Accordingly, the example master fault matrix [N, M] (208) reflects a union of the cluster fault matrix (see e.g., FIG. 2C) for the first composed service cluster and the cluster fault matrix (see e.g., FIG. 2D) for the second composed service cluster. That is, by employing an element-wise Boolean union of (or a matrix union) of the two cluster fault matrices, any element (n, m) of the example master fault matrix [N, M] (208)=the Boolean union (U) between the same element (n, m) of the cluster fault matrix [N, M] (204) for the first composed service cluster and the same element (n, m) of the cluster fault matrix [N, M] (206) for the second composed service cluster.

FIGS. 3A-3E show a flowchart describing a method for receiving and processing service fault assessment requests.

The various steps outlined below may be performed by the fault isolation assessor (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Figure 3A:
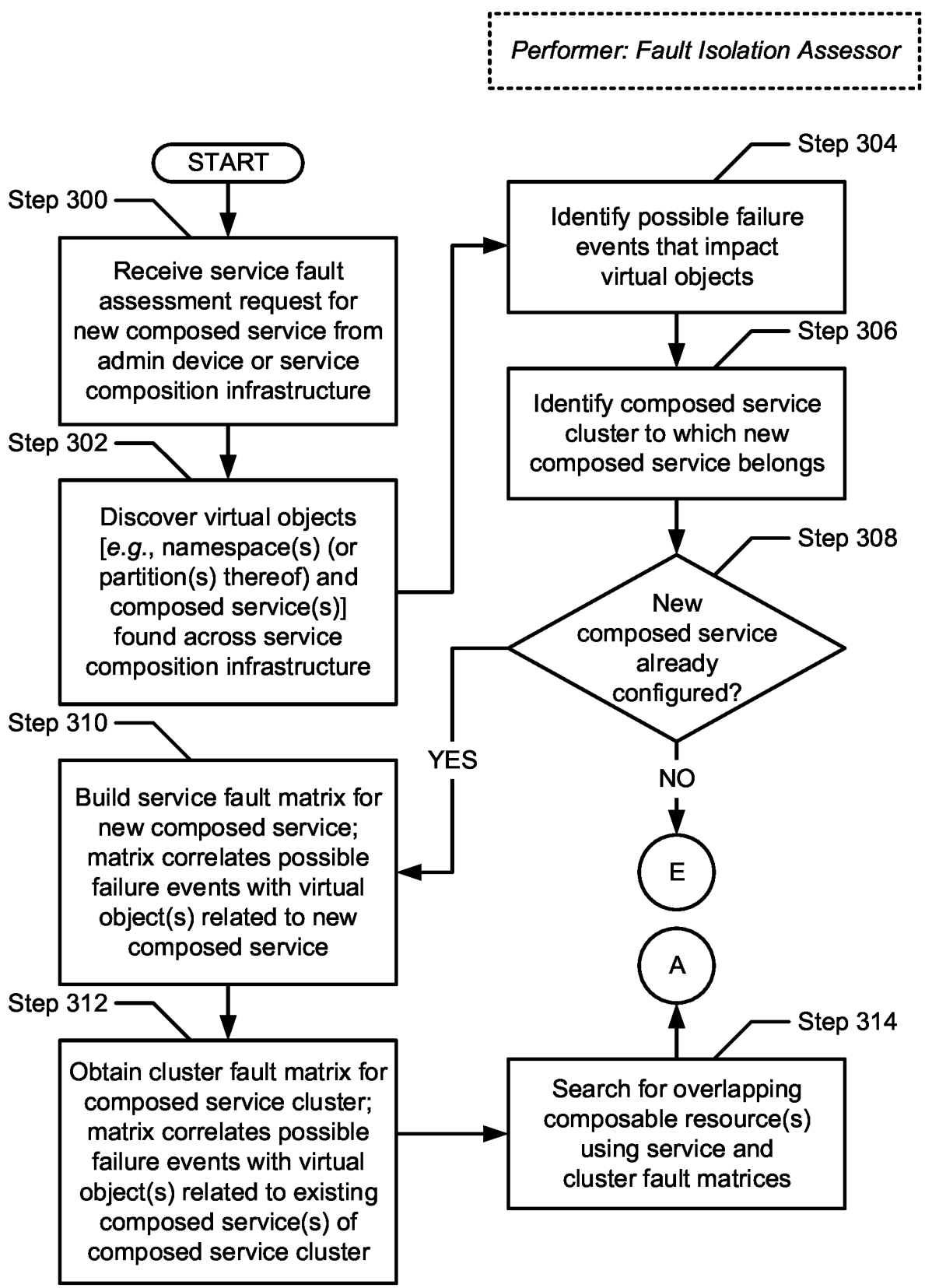
FIGS. 3A-3E show a flowchart describing a method for receiving and processing service fault assessment requests in accordance with one or more embodiments described herein.

Turning to FIG. 3A, in Step 300, a service fault assessment request is received. In one or many embodiment(s) described herein, the admin device (see e.g., FIG. 1A) may submit the service fault assessment request. In one or many other embodiment(s) described herein, the service composition infrastructure (see e.g., FIGS. 1A and 1B) may alternatively submit the service fault assessment request. Further, the service fault assessment request may pertain to performing a fault isolation assessment for a new composed service (see e.g., FIG. 1B). Fault isolation, as described herein, may refer to the limitation of a failure (of any physical or hardware component of the service composition infrastructure and used by any given composed service cluster) to a single composed service of said given composed service cluster.

In Step 302, various virtual objects, found across the service composition infrastructure, are discovered. In one or many embodiment(s) described herein, the virtual objects may include: one or more storage namespaces (or storage namespace partitions thereof) each referring to a logically separated, individually addressable subset of a logical storage pool that may span, in whole or in part, on/across one or more physical storage devices; one or more memory namespaces (or memory namespace partitions thereof) each referring to a logically separated, individually addressable subset of a logical memory pool that may span, in whole or in part, on/across one or more physical memory devices; one or more accelerator namespaces (or accelerator namespace partitions thereof) each referring to a logically separated, individually addressable subset of a logical accelerator pool that may span, in whole or in part, on/across one or more physical accelerator devices; and/or one or more existing composed services each referring to a virtual network server (e.g., a virtual machine or a container configured to emulate a physical network server) whereon a guest operating system and/or any number of workloads (e.g., applications) may execute.

In Step 304, any number of possible failure events are identified. In one or many embodiment(s) described herein, each of the possible failure events, when triggered, may impact one or more of the virtual objects (discovered in Step 302). More precisely, each of the possible failure events may represent, or correspond to, a failure of a physical (i.e., hardware) component (also referred to herein as a physical infrastructure component), found across the service composition infrastructure, which may support, in whole or in part, the implementation and operation of one or more virtual objects. Examples of said physical infrastructure component may include, but are not limited to, a storage device, a composable storage enclosure, a memory device, a composable memory enclosure, an accelerator device, a composable accelerator enclosure, and a composed service host (see e.g., FIG. 1B). Further, examples of possible failure events may be presented as the matrix row labels of the matrices illustrated and described with respect to FIGS. 2A-2E, above.

In Step 306, a composed service cluster, referring to a collection of at least one composed service, is identified. In one or many embodiment(s) described herein, the new composed service (for which the service fault assessment request had been received in Step 300) may belong, or may prospectively be assigned, to the composed service cluster.

In Step 308, a determination is made as to whether the new composed service (for which the service fault assessment request had been received in Step 300) is already configured. In being configured, the new composed service may already have one or more remote resources (e.g., at least one of composable storage resources, composable memory resources, and composable accelerator resources (see e.g., FIGS. 1B and 1C)) provisioned to the new composed service, whereas, in not being configured, the new composed service has yet to be provisioned any remote resources. As such, in one or many embodiment(s) described herein, if it is determined that the new composed service has been configured, then the method proceeds to Step 310. On the other hand, in one or many other embodiment(s) described herein, if it is alternatively determined that the new composed service has not yet been configured, then the method alternatively proceeds to Step 360 (see e.g., FIG. 3D).

In Step 310, following the determination (made in Step 308) that the new composed service (for which the service fault assessment request had been received in Step 300) has been configured, a service fault matrix, for the new composed service, is built. In one or many embodiment(s) described herein, the service fault matrix may represent any data structure that may be arranged using any number of rows N and any number of columns M. The rows N each reflect a possible failure event that could befall a physical infrastructure component of the service composition infrastructure (see e.g., FIG. 1B). The columns M, meanwhile, each reflect a virtual object supported by any one or more physical infrastructure component(s). The service fault matrix, accordingly, may convey the correlation between possible failure events and virtual objects-both with respect (or related) to new composed service. Non-limiting examples of a service fault matrix are illustrated and described with respect to FIGS. 2A and 2B, above.

In Step 312, a cluster fault matrix, for the composed service cluster (identified in Step 306), is obtained. In one or many embodiment(s) described herein, the cluster fault matrix may represent any data structure that may be arranged using any number of rows N and any number of columns M. The rows N each reflect a possible failure event that could befall a physical infrastructure component of the service composition infrastructure (see e.g., FIG. 1B). The columns M, meanwhile, each reflect a virtual object supported by any one or more physical infrastructure component(s). The cluster fault matrix, accordingly, may convey the correlation between possible failure events and virtual objects-both with respect (or related) to the composed service cluster. Non-limiting examples of a cluster fault matrix are illustrated and described with respect to FIGS. 2C and 2D, above.

In Step 314, the service fault matrix (built in Step 310) and the cluster fault matrix (obtained in Step 312) are used to search for any overlapping composable resource(s) therebetween. In one or many embodiment(s) described herein, an overlapping composable resource may refer to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B) and may be shared by the new composed service (for which the service assessment request had been received in Step 300) and at least one of the existing composed service(s) of the composed service cluster (identified in Step 306).

In one or many embodiment(s) described herein, the objective here may be to minimize, if not eliminate, composable resource overlap amongst any composed service(s) belonging to any given composed service cluster, thereby minimizing, if not eliminating, the inoperability of multiple composed services that may be impacted by the prospective failure of any single physical infrastructure component shared there-amongst.

In one or many embodiment(s) described herein, the discovery of any overlap between the service and cluster fault matrices may, for example, employ an element-wise Boolean intersection (or a matrix intersection) of the two matrices. That is, with the service fault matrix, the cluster fault matrix, and the resulting matrix intersection being of the same dimensions [N, M], any element (n, m) of the matrix intersection=the Boolean intersection (n) between the same element (n, m) of the service fault matrix and the same element (n, m) of the cluster fault matrix. Further, any element (n, m) of the matrix intersection may reflect a zero (0) value indicating no overlap, or a one (1) value alternatively indicating an overlap.

Hereinafter, the method proceeds to Step 320 (see e.g., FIG. 3B).

Figure 3B:
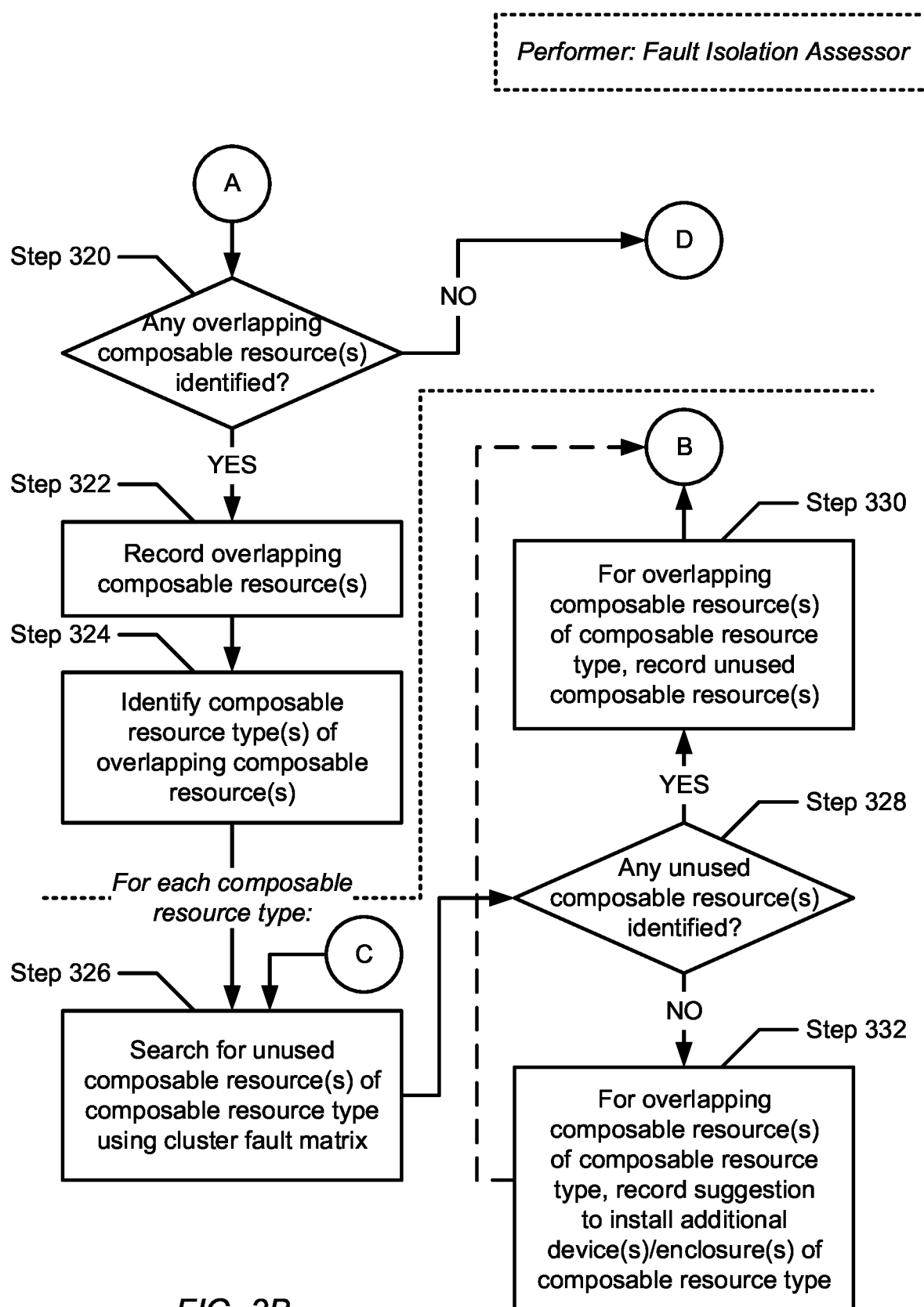

Turning to FIG. 3B, in Step 320, a determination is made as to whether the search (performed in Step 314) identified any overlapping composable resource(s) between the service fault matrix (built in Step 310) and the cluster fault matrix (obtained in Step 312). Within the above-mentioned matrix intersection (as well as the service fault matrix and the cluster fault matrix), any element (n, m) may correspond to a given possible failure event (mapped to row n) and a given virtual object (mapped to column m). For any overlapping composable resource(s) to be identified: first, at least one element (n, m) of the matrix intersection should reflect a one (1) value-should each and every element (n, m) of the matrix intersection instead reflect a zero (0) value, then no composable resource(s) between the service fault matrix and the cluster fault matrix overlap; and second, any of the at least one element (n, m) of the matrix intersection, reflecting a one (1) value, should map to a possible failure event related to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B).

Figure 3C:
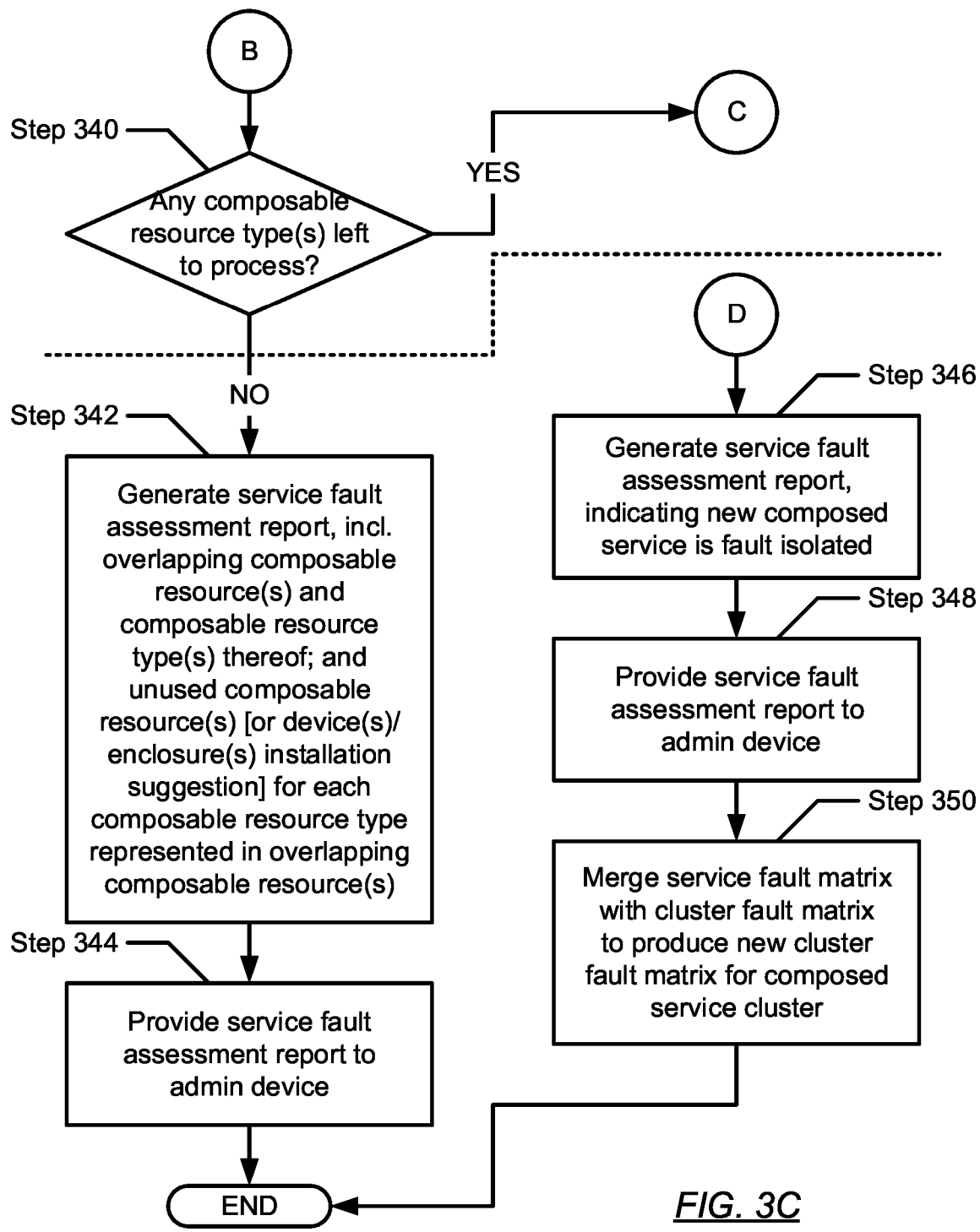

As such, in one or many embodiment(s) described herein, if it is determined that no overlapping composable resource(s) have been identified based on the search (performed in Step 314), then the method proceeds to Step 346 (see e.g., FIG. 3C). On the other hand, in one or many other embodiment(s) described herein, if it is alternatively determined that at least one overlapping composable resource has been identified, then the method alternatively proceeds to Step 322.

In Step 322, following the determination (made in Step 320) that at least one overlapping composable resource has been identified based on the search (performed in Step 314) between the service fault matrix (built in Step 310) and the cluster fault matrix (obtained in Step 312), the identified overlapping composable resource(s) is/are recorded. In one or many embodiment(s) described herein, recordation of the overlapping composable resource(s) may, for example, entail collecting identification information (e.g., a device identifier (ID) or an enclosure ID) associated therewith.

In Step 324, the composable resource type(s), representing the overlapping composable resource(s) (recorded in Step 322), is/are identified. In one or many embodiment(s) described herein, said composable resource type of any given overlapping composable resource may, for example, be obtained from composable resource metadata associated with the given overlapping composable resource.

A subset of the remaining steps (i.e., Steps 326, 328, 330, 332, and 340) presented and described hereinafter are pertinent to, and thus are performed for, each composable resource type (identified in Step 324).

In Step 326, the cluster fault matrix (obtained in Step 312) is used to search for any unused composable resource(s) of the composable resource type therein. In one or many embodiment(s) described herein, an unused composable resource may refer to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B) and may be unused by any of the existing composed service(s) of the composed service cluster (identified in Step 306).

In Step 328, a determination is made as to whether the search (performed in Step 326) identified any unused composable resource(s) through at least the cluster fault matrix (obtained in Step 312). Within the cluster fault matrix [N, M], any element (n, m) may correspond to a given possible failure event (mapped to row n) and a given virtual object (mapped to column m). For any unused composable resource(s) to be identified: first, identify one or more rows of the cluster fault matrix corresponding to a possible failure event related to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B); and, second, filter the identified row(s) of the cluster fault matrix to identify at least a subset of said identified row(s) each reflecting all zero (0) values there-throughout.

As such, in one or many embodiment(s) described herein, if it is determined that at least one unused composable resource has been identified based on the search (performed in Step 326), then the method proceeds to Step 330. On the other hand, in one or many other embodiment(s) described herein, if it is alternatively determined that no unused composable resource(s) have been identified, then the method alternatively proceeds to Step 332.

In Step 330, following the determination (made in Step 328) that at least one unused composed resource has been identified based on the search (performed in Step 326) using at least the cluster fault matrix (obtained in Step 312), the identified unused composable resource(s) is/are recorded. In one or many embodiment(s) described herein, the recorded unused composable resource(s) may be associated with, and thus may serve to suggestively replace (in order to maximize fault isolation) at least a subset of the overlapping composable resource(s) (recorded in Step 322) of the composable resource type. Further, recordation of the unused composable resource(s) of the composable resource type may, for example, entail collecting identification information (e.g., a device identifier (ID) or an enclosure ID) associated therewith.

Hereinafter, the method proceeds to Step 340 (see e.g., FIG. 3C).

In Step 332, following the alternative determination (made in Step 328) that no unused composed resource(s) have been identified based on the search (performed in Step 326) using at least the cluster fault matrix (obtained in Step 312), one or more suggestions is/are recorded. In one or many embodiment(s) described herein, the recorded suggestion(s) may be devised with the intention of maximizing fault isolation between the new composed service (for which the service fault assessment request had been received in Step 300) and the existing composed service(s) of the composed service cluster (identified in Step 306). By way of an example, a suggestion—directed to replace (in order to maximize fault isolation) at least a subset of the overlapping composable resource(s) (recorded in Step 322) of the composable resource type—may reference an expansion of the service composition infrastructure by installing one or more additional physical infrastructure components (e.g., a storage device, a composable storage enclosure, a memory device, a composable memory enclosure, an accelerator device, or a composable accelerator enclosure) of the composable resource type (e.g., storage, memory, or accelerator).

Hereinafter, the method proceeds to Step 340 (see e.g., FIG. 3C).

Turning to FIG. 3C, in Step 340, following recordation of the unused composable resource(s) (in Step 330) of the composable resource type, or following the recordation of one or more suggestions (in Step 332), a determination is made as to whether any composable resource type(s) (identified in Step 324) remain to be processed/assessed. That is, in one or many embodiment(s) described herein, if it is determined that all composable resource type(s), representing the overlapping composable resource(s) (recorded in Step 322), have undergone processing/assessment, then the method proceeds to Step 342. On the other hand, in one or many other embodiment(s) described herein, if it is alternatively determined that at least one composable resource type, representing the overlapping resource(s), has yet to undergo processing/assessment, then the method alternatively proceeds to Step 326 (described above), where the cluster fault matrix (obtained in Step 312) may be used to search for any unused composable resource(s) of said remaining composable resource type therein.

In Step 342, following the determination (made in Step 340) that all composable resource type(s) (identified in Step 324), representing the overlapping composable resource(s) (recorded in Step 322), have undergone processing/assessment, a service fault assessment report is generated. In one or many embodiment(s) described herein, the service fault assessment report may include, but is not limited to: the overlapping composable resource(s) (recorded in Step 322), which may point out any physical infrastructure component(s) shared between the already configured new composed service (for which the service fault assessment request had been received in Step 300) and at least one existing composed service of the composed service cluster (identified in Step 306); the composable resource type(s) (identified in Step 324), which may represent said overlapping composable resource(s); and, for each composable resource type of said composable resource type(s): either (i) the unused composable resource(s) of said composable resource type (recorded in Step 330), which may highlight any physical infrastructure component(s) unused by any of the existing composed service(s) of said composed service cluster and through which the new composed service may be supported (to maximize the fault isolation thereof), or (ii) the suggestion(s) corresponding to said composable resource type (recorded in Step 332), which may be followed to maximize the fault isolation of the already configured new composed service.

In Step 344, the service fault assessment report (generated in Step 342) is transmitted, or otherwise provided, to the admin device (see e.g., FIG. 1A). Thereafter, in one or many embodiment(s) described herein, any system administrator(s), operating the admin device, may review the service fault assessment report and act (e.g., select an unused composable resource of each of the composable resource type(s) representing the overlapping composable resource(s) to re-configure the new composed service with, proceed to follow a suggestion of the suggestion(s) offered, etc.) appropriately towards maximizing the fault isolation of the new composed service, and/or between the new composed service and the existing composed service(s) of the composed service cluster (identified in Step 306).

In Step 346, following the alternate determination (made in Step 320) that no overlapping composable resource(s) have been identified based on the search (performed in Step 314) between the service fault matrix (built in Step 310) and the cluster fault matrix (obtained in Step 312), a service fault assessment report is generated. In one or many embodiment(s) described herein, the service fault assessment report may indicate that the already configured new composed service (for which the service fault assessment request had been received in Step 300) has been assessed to be fault isolated.

In Step 348, the service fault assessment report (generated in Step 346) is transmitted, or otherwise provided, to the admin device (see e.g., FIG. 1A). Thereafter, in one or many embodiment(s) described herein, any system administrator(s), operating the admin device, may review the service fault assessment report and act (e.g., maintain the current configuration of composable resources provisioned to the new composed service) appropriately.

In Step 350, the service fault matrix (built in Step 310) is merged with the cluster fault matrix (obtained in Step 312). In one or many embodiment(s) described herein, merging of the two matrices may, for example, employ an element-wise Boolean union (or a matrix union) of the two matrices. That is, with the service fault matrix, the cluster fault matrix, and the resulting matrix union (i.e., a new cluster fault matrix) being of the same dimensions [N, M], any element (n, m) of the new cluster fault matrix=the Boolean union (U) between the same element (n, m) of the service fault matrix and the same element (n, m) of the cluster fault matrix.

Figure 3D:
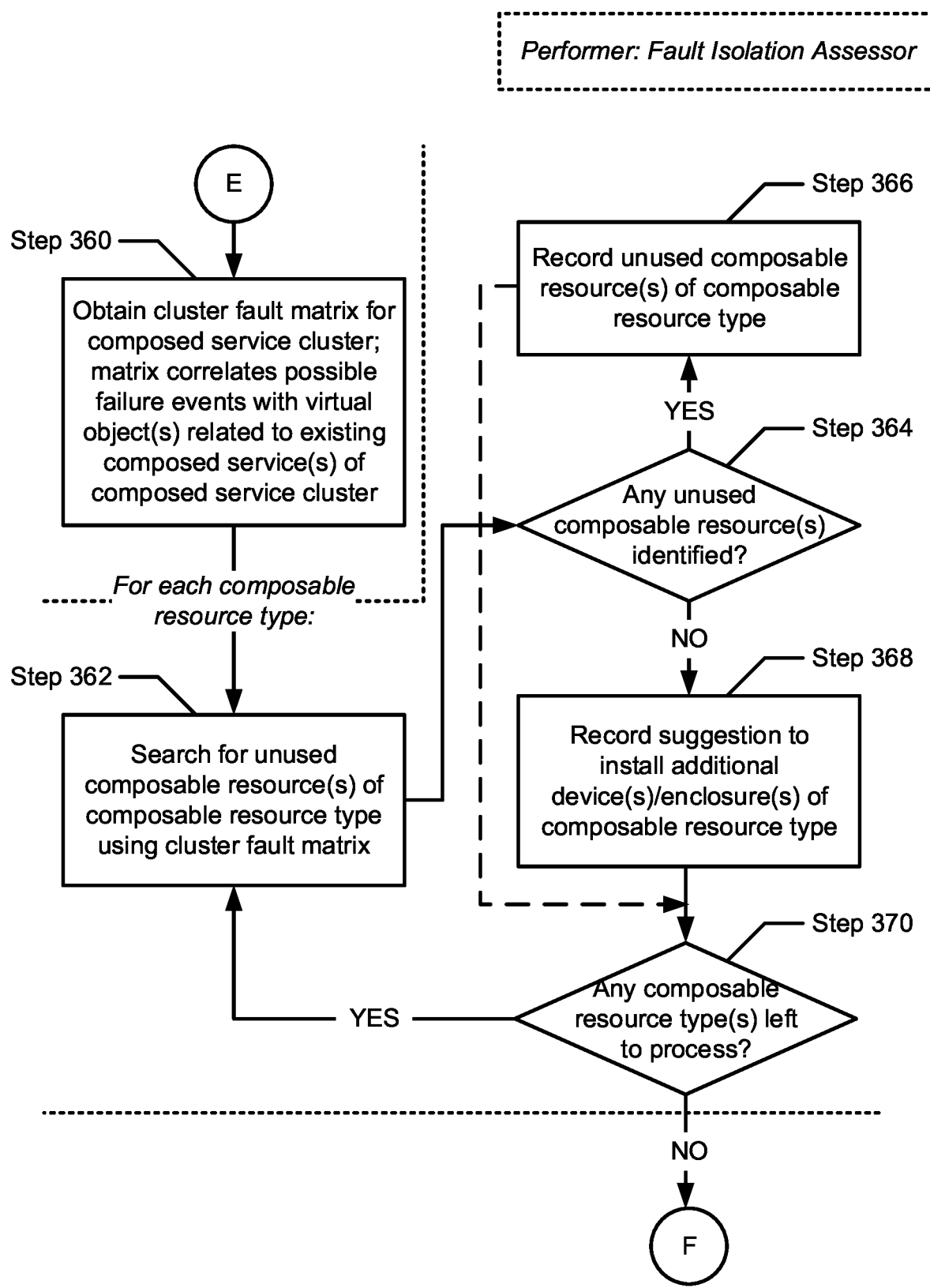

Turning to FIG. 3D, in Step 360, following the alternate determination (made in Step 308) that the new composed service (for which the service fault assessment request had been received in Step 300) has yet to be configured, a cluster fault matrix, for the composed service cluster (identified in Step 306), is obtained. In one or many embodiment(s) described herein, the cluster fault matrix may represent any data structure that may be arranged using any number of rows N and any number of columns M. The rows N each reflect a possible failure event that could befall a physical infrastructure component of the service composition infrastructure (see e.g., FIG. 1B). The columns M, meanwhile, each reflect a virtual object supported by any one or more physical infrastructure component(s). The cluster fault matrix, accordingly, may convey the correlation between possible failure events and virtual objects-both with respect (or related) to the composed service cluster. Non-limiting examples of a cluster fault matrix are illustrated and described with respect to FIGS. 2C and 2D, above.

A subset of the remaining steps (i.e., Steps 362, 364, 366, 368, and 370) presented and described hereinafter are pertinent to, and thus are performed for, each composable resource type of the three composable resource types (e.g., storage, memory, and accelerator) available across the service composition infrastructure (see e.g., FIG. 1B).

In Step 362, the cluster fault matrix (obtained in Step 360) is used to search for any unused composable resource(s) of the composable resource type therein. In one or many embodiment(s) described herein, an unused composable resource may refer to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B) and may be unused by any of the existing composed service(s) of the composed service cluster (identified in Step 306).

In Step 364, a determination is made as to whether the search (performed in Step 362) identified any unused composable resource(s) through at least the cluster fault matrix (obtained in Step 360). Within the cluster fault matrix [N, M], any element (n, m) may correspond to a given possible failure event (mapped to row n) and a given virtual object (mapped to column m). For any unused composable resource(s) to be identified: first, identify one or more rows of the cluster fault matrix corresponding to a possible failure event related to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B); and, second, filter the identified row(s) of the cluster fault matrix to identify at least a subset of said identified row(s) each reflecting all zero (0) values there-throughout.

As such, in one or many embodiment(s) described herein, if it is determined that at least one unused composable resource has been identified based on the search (performed in Step 362), then the method proceeds to Step 366. On the other hand, in one or many other embodiment(s) described herein, if it is alternatively determined that no unused composable resource(s) have been identified, then the method alternatively proceeds to Step 368.

In Step 366, following the determination (made in Step 364) that at least one unused composed resource of the composable resource type has been identified based on the search (performed in Step 362) using at least the cluster fault matrix (obtained in Step 360), the identified unused composable resource(s) is/are recorded. In one or many embodiment(s) described herein, the recorded unused composable resource(s) of the composable resource type may serve as option(s) with which the not yet configured new composed service may be prospectively configured and/or provisioned. Further, recordation of the unused composable resource(s) of the composable resource type may, for example, entail collecting identification information (e.g., a device identifier (ID) or an enclosure ID) associated therewith.

Hereinafter, the method proceeds to Step 370.

In Step 368, following the alternate determination (made in Step 364) that no unused composed resource(s) have been identified based on the search (performed in Step 362) using at least the cluster fault matrix (obtained in Step 360), one or more suggestions is/are recorded. In one or many embodiment(s) described herein, the recorded suggestion(s) may be devised with the intention of maximizing fault isolation between the not yet configured new composed service (for which the service fault assessment request had been received in Step 300) and the existing composed service(s) of the composed service cluster (identified in Step 306). By way of an example, a suggestion may reference an expansion of the service composition infrastructure by installing one or more additional physical infrastructure components (e.g., a storage device, a composable storage enclosure, a memory device, a composable memory enclosure, an accelerator device, or a composable accelerator enclosure) of the composable resource type (e.g., storage, memory, or accelerator).

Hereinafter, the method proceeds to Step 370.

In Step 370, following recordation of the unused composable resource(s) (in Step 366) of the composable resource type, or following the recordation of one or more suggestions (in Step 368), a determination is made as to whether any composable resource type(s) (of the three available composable resource types) remain to be processed/assessed. That is, in one or many embodiment(s) described herein, if it is determined that all available composable resource types have undergone processing/assessment, then the method proceeds to Step 380 (see e.g., FIG. 3E). On the other hand, in one or many other embodiment(s) described herein, if it is alternatively determined that at least one available composable resource type has yet to undergo processing/assessment, then the method alternatively proceeds to Step 362 (described above), where the cluster fault matrix (obtained in Step 360) may be used to search for any unused composable resource(s) of said remaining available composable resource type therein.

Figure 3E:
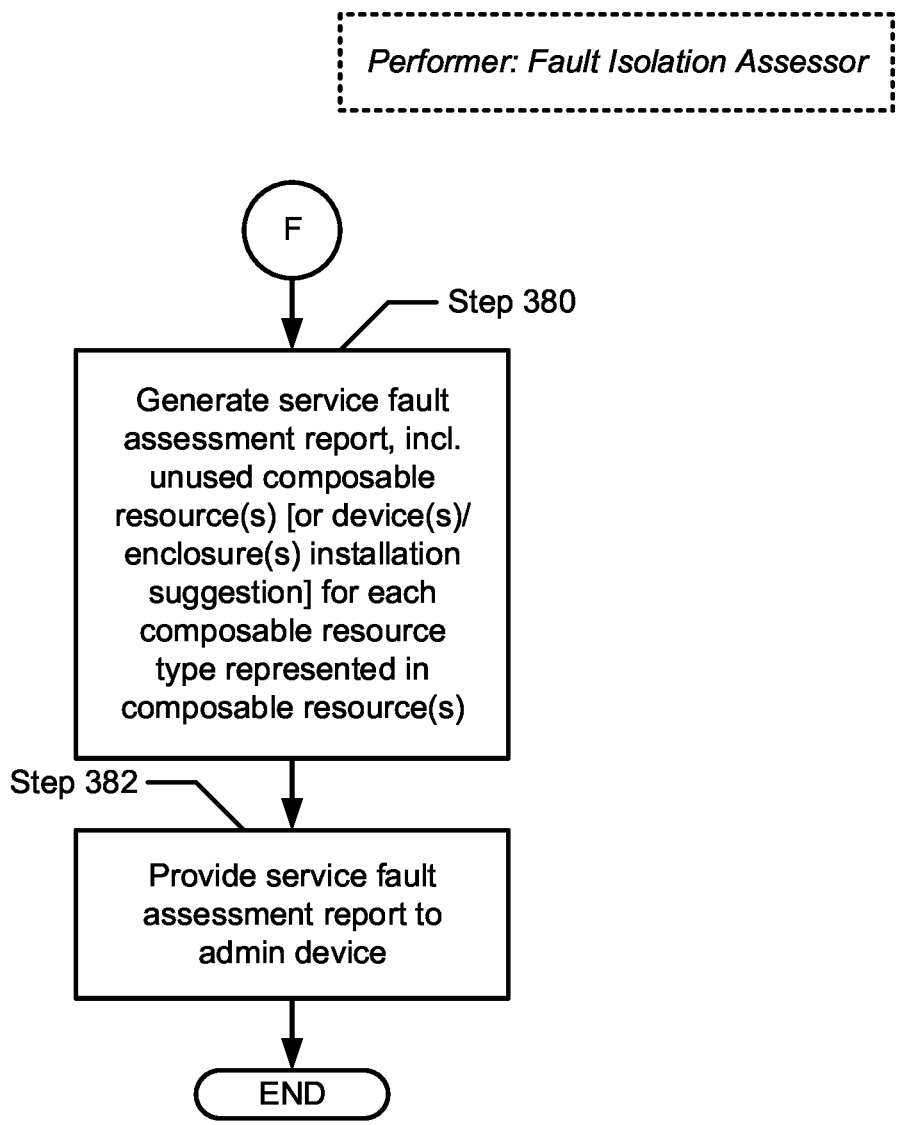

Turning to FIG. 3E, in Step 380, following the determination (made in Step 370) that all composable resource types (of the three available composable resource types) have undergone processing/assessment, a service fault assessment report is generated. In one or many embodiment(s) described herein, the service fault assessment report may include, but is not limited to: for each composable resource type of the three available composable resource types: either (i) the unused composable resource(s) of said composable resource type (recorded in Step 366), which may highlight any physical infrastructure component(s) unused by any of the existing composed service(s) of the composed service cluster (identified in Step 306) and through which the not yet configured new composed service may be supported (to maximize the fault isolation thereof), or (ii) the suggestion(s) corresponding to said composable resource type (recorded in Step 368), which may be followed to maximize the fault isolation of the not yet configured new composed service.

In Step 382, the service fault assessment report (generated in Step 380) is transmitted, or otherwise provided, to the admin device (see e.g., FIG. 1A). Thereafter, in one or many embodiment(s) described herein, any system administrator(s), operating the admin device, may review the service fault assessment report and act (e.g., select an unused composable resource of each of the available composable resource types to configure the new composed service with, proceed to follow a suggestion of the suggestion(s) offered, etc.) appropriately towards maximizing the fault isolation of the new composed service, and/or between the new composed service and the existing composed service(s) of the composed service cluster (identified in Step 306).

FIGS. 4A-4E show a flowchart describing a method for receiving and processing failure event notices. The various steps outlined below may be performed by the fault isolation assessor (see e.g., FIG. 1A). Further, while the various steps in the flowchart are presented and described sequentially, one of ordinary skill will appreciate that some or all steps may be executed in different orders, may be combined or omitted, and some or all steps may be executed in parallel.

Figure 4A:
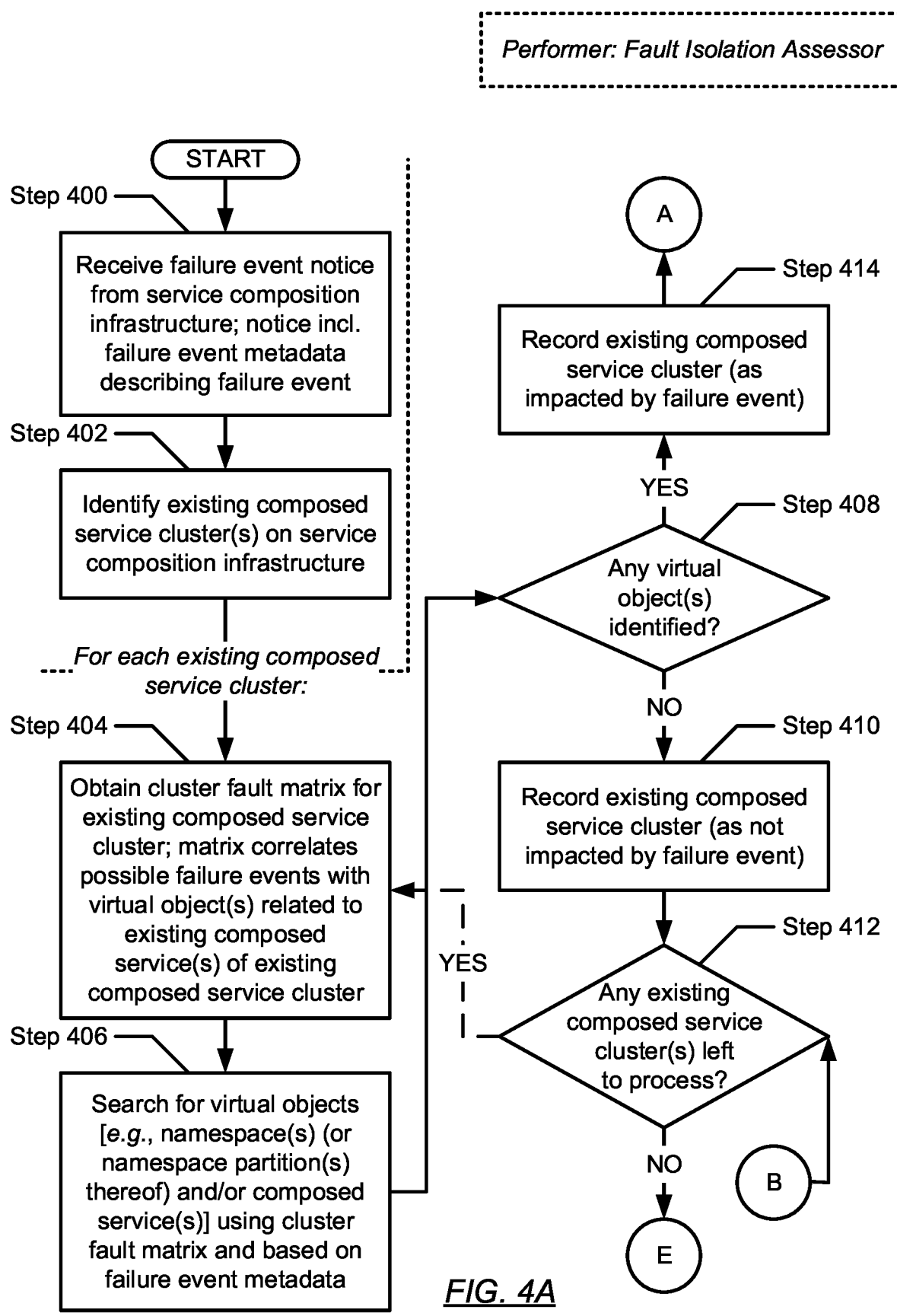
FIGS. 4A-4E show a flowchart describing a method for receiving and processing failure event notices in accordance with one or more embodiments described herein.

Turning to FIG. 4A, in Step 400, a failure event notice is received from the service composition infrastructure. In one or many embodiment(s) described herein, the failure event notice may pertain to a failure event that incurred within the service composition infrastructure. Said failure event may involve a physical (i.e., hardware) component (also referred to herein as a physical infrastructure component), found across the service composition infrastructure, which may support, in whole or in part, the implementation and operation of one or more virtual objects (described below) (see e.g., Step 406). Examples of said physical infrastructure component may include, but are not limited to, a storage device, a composable storage enclosure, a memory device, a composable memory enclosure, an accelerator device, a composable accelerator enclosure, and a composed service host (see e.g., FIG. 1B). Furthermore, the failure event notice may include failure event metadata (e.g., a failure event identifier (ID) or code associated with the failure event, an infrastructure component ID associated with the involved physical infrastructure component, etc.) describing the failure event.

In Step 402, one or more existing composed service clusters, configured within the service composition infrastructure (see e.g., FIG. 1B), is/are identified. In one or many embodiment(s) described herein, each existing composed service cluster may reference a logical grouping of at least one existing composed service.

A subset of the remaining steps (i.e., Steps 404, 406, 408, 410, 412, 414, 420, 422, 424, 426, 428, 430, 432, 440, 442, 444, 446, 448, 450, 460, 462, 464, 466, 468, and 470) presented and described hereinafter are pertinent to, and thus are performed for, each existing composed service cluster (identified in Step 402).

In Step 404, a cluster fault matrix, for the composed service cluster, is obtained. In one or many embodiment(s) described herein, the cluster fault matrix may represent any data structure that may be arranged using any number of rows N and any number of columns M. The rows N each reflect a possible failure event that could befall a physical infrastructure component of the service composition infrastructure (see e.g., FIG. 1B). The columns M, meanwhile, each reflect a virtual object supported by any one or more physical infrastructure component(s). The cluster fault matrix, accordingly, may convey the correlation between possible failure events and virtual objects-both with respect (or related) to the composed service cluster. Non-limiting examples of a cluster fault matrix are illustrated and described with respect to FIGS. 2C and 2D, above.

In Step 406, the cluster fault matrix (obtained in Step 404) is used to search for any virtual object(s) correlating to the failure event (to which the failure event notice received in Step 400 pertains). In one or many embodiment(s) described herein, any virtual object may include: a storage namespace (or a storage namespace partition thereof) referring to a logically separated, individually addressable subset of a logical storage pool that may span, in whole or in part, on/across one or more physical storage devices; a memory namespace (or a memory namespace partition thereof) referring to a logically separated, individually addressable subset of a logical memory pool that may span, in whole or in part, on/across one or more physical memory devices; an accelerator namespace (or an accelerator namespace partition thereof) referring to an logically separated, individually addressable subset of a logical accelerator pool that may span, in whole or in part, on/across one or more physical accelerator devices; and/or an existing composed service referring to a virtual network server (e.g., a virtual machine or a container configured to emulate a physical network server) whereon a guest operating system and/or any number of workloads (e.g., applications) may execute.

In Step 408, a determination is made as to whether the search (performed in Step 406) identified any virtual object(s) through at least the cluster fault matrix (obtained in Step 404). Within the cluster fault matrix [N, M], any element (n, m) may correspond to a given possible failure event (mapped to row n) and a given virtual object (mapped to column m). For any virtual object(s) to be identified: first, the failure event metadata (enclosed within the failure event notice received in Step 400) may be mapped to a possible failure event (and thus a corresponding row n of the cluster fault matrix); second, identify at least one element (n=row mapped to possible failure event, m) each reflecting a one (1) value; and, third, for each identified element (n=row mapped to possible failure event, m): mapping the column m of said identified element to a virtual object.

As such, in one or many embodiment(s) described herein, if it is determined that no virtual object(s) have been identified based on search (performed in Step 406), then the method proceeds to Step 410. On the other hand, in one or many other embodiment(s) described herein, if it is alternatively determined that at least one virtual object has been identified based on the search (performed in Step 406), then the method alternatively proceeds to Step 414.

In Step 410, following the determination (made in Step 408) that no virtual object(s) have been identified based on the search (performed in Step 406) using at least the cluster fault matrix (obtained in Step 404) for the existing composed service cluster, said existing composed service cluster is recorded as not being impacted by the failure event (to which the failure event notice received in Step 400 pertains).

In Step 412, a determination is made as to whether any existing composed service cluster(s) (identified in Step 402) remain to be processed/assessed. That is, in one or many embodiment(s) described herein, if it is determined that all existing composed service cluster(s) have undergone processing/assessment, then the method proceeds to Step 480. On the other hand, in one or many other embodiment(s) described herein, if it is alternatively determined that at least one existing composed service cluster has yet to undergo processing/assessment, then the method alternatively proceeds to Step 404 (described above), where another cluster fault matrix, for a/the remaining existing composed service cluster, may be obtained.

In Step 414, following the alternate determination (made in Step 408) that at least one virtual object has been identified based on the search (performed in Step 406) using at least the cluster fault matrix (obtained in Step 404) for the existing composed service cluster, said existing composed service cluster is recorded as being impacted by the failure event (to which the failure event notice received in Step 400 pertains).

Hereinafter, the method proceeds to Step 420 (see e.g., FIG. 4B).

Figure 4B:
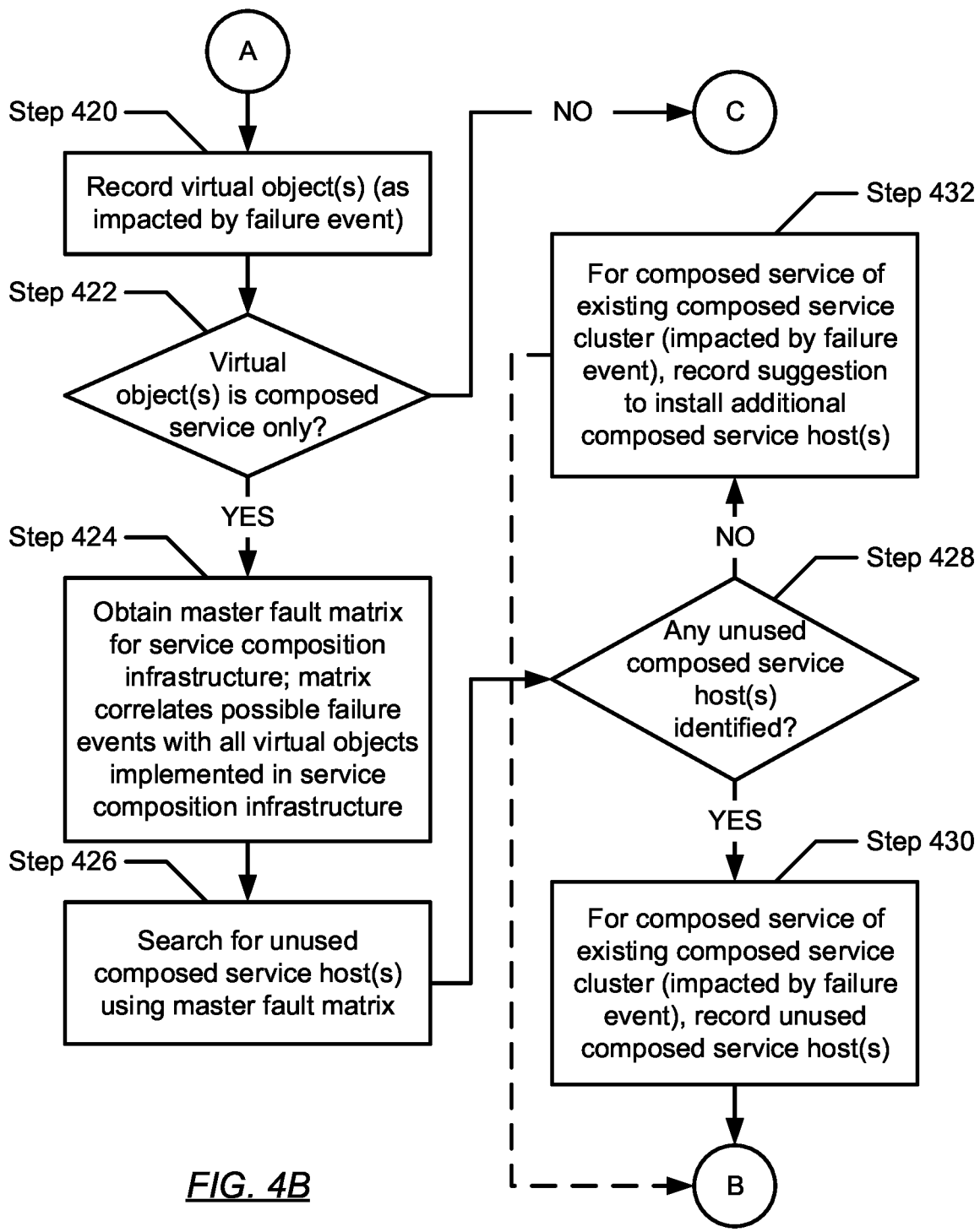

Turning to FIG. 4B, in Step 420, the virtual object(s) identified based on the search (performed in Step 406) using at least the cluster fault matrix (obtained in Step 404) for the existing composed service cluster, is/are recorded. In one or many embodiment(s) described herein, the recorded virtual object(s) may reference one or more virtual objects, related to or used by the existing composed service(s) of the existing composed service cluster, which may be impacted by the failure event (to which the failure event notice received in Step 400 pertains). Further, recordation of the virtual object(s) may, for example, entail collecting identification information (e.g., a namespace identifier (ID), a namespace partition ID, or a composed service ID) associated therewith.

In Step 422, a determination is made as to whether the virtual object(s), identified based on the search (performed in Step 406) using at least the cluster fault matrix (obtained in Step 404) for the existing composed service cluster, is a single virtual object in the form of an existing composed service of the existing composed service cluster. In one or many embodiment(s) described herein, if it is determined that the identified virtual object(s) is indeed a single virtual object in the form of an existing composed service of the existing composed service cluster, then the method proceeds to Step 424. On the other hand, in one or many other embodiment(s) described herein, if it is alternatively determined that the identified virtual object(s) is/are not a single virtual object in the form of an existing composed service of the existing composed service cluster, then the method alternatively proceeds to Step 440 (see e.g., FIG. 4C).

In Step 424, following the determination (made in Step 422) that the virtual object(s), identified based on the search (performed in Step 406) using at least the cluster fault matrix (obtained in Step 404) for the existing composed service cluster is a single virtual object in the form of an existing composed service of the existing composed service cluster, a master fault matrix, for the service composition infrastructure, is obtained. In one or many embodiment(s) described herein, the master fault matrix may represent any data structure that may be arranged using any number of rows N and any number of columns M. The rows N each reflect a possible failure event that could befall a physical infrastructure component of the service composition infrastructure (see e.g., FIG. 1B). The columns M, meanwhile, each reflect a virtual object supported by any one or more physical infrastructure component(s). The master fault matrix, accordingly, conveys the correlation between possible failure events and virtual objects-both with respect (or related) to the service composition infrastructure in entirety. A non-limiting example of a master fault matrix is illustrated and described with respect to FIG. 2E, above.

In Step 426, the master fault matrix (obtained in Step 424) is used to search for any unused composed service host(s) present throughout the service composition infrastructure. In one or many embodiment(s) described herein, an unused composed service host may reference a physical network server without any composed service(s) deployed thereon.

In Step 428, a determination is made as to whether the search (performed in Step 426), using the master fault matrix (obtained in Step 424), identified any unused composed service host(s). Within the master fault matrix [N, M], any element (n, m) may correspond to a given possible failure event (mapped to row n) and a given virtual object (mapped to column m). For any unused composed service host(s) to be identified: first, one or more possible failure events each corresponding to a possible failure event that may occur on a composed service host may be identified; second, the identified possible failure event(s) may be mapped to corresponding row(s) of the master fault matrix; and, third, filter the identified row(s) of the master fault matrix to identify at least a subset of said identified row(s) each reflecting all zero (0) values there-throughout.

As such, in one or many embodiment(s) described herein, if it is determined that at least one unused composed service host has been identified based on the search (performed in Step 426), then the method proceeds to Step 430. On the other hand, in one or many other embodiment(s) described herein, if it is alternatively determined that no unused composed service host(s) have been identified based on the search (performed in Step 426), then the method alternatively proceeds to Step 432.

In Step 430, following the determination (made in Step 428) that at least one unused composed service host has been identified based on the search (performed in Step 426), the identified unused composed service host(s) is/are recorded. In one or many embodiment(s) described herein, recordation of the unused composed service host(s) may, for example, entail collecting identification information (e.g., a composed service host identifier (ID)) associated therewith.

Hereinafter, the method proceeds to Step 412 (see e.g., FIG. 4A).

In Step 432, following the alternate determination (made in Step 428) that no unused composed service host(s) have been identified based on the search (performed in Step 426), one or more suggestions is/are recorded. In one or many embodiment(s) described herein, the recorded suggestion(s) may be devised with the intention of maximizing fault isolation amongst the existing composed service(s) of the existing composed service cluster. By way of an example, a suggestion may reference an expansion of the service composition infrastructure by installing one or more additional physical infrastructure components (e.g., a composed service host).

Hereinafter, the method proceeds to Step 412 (see e.g., FIG. 4A).

Figure 4C:
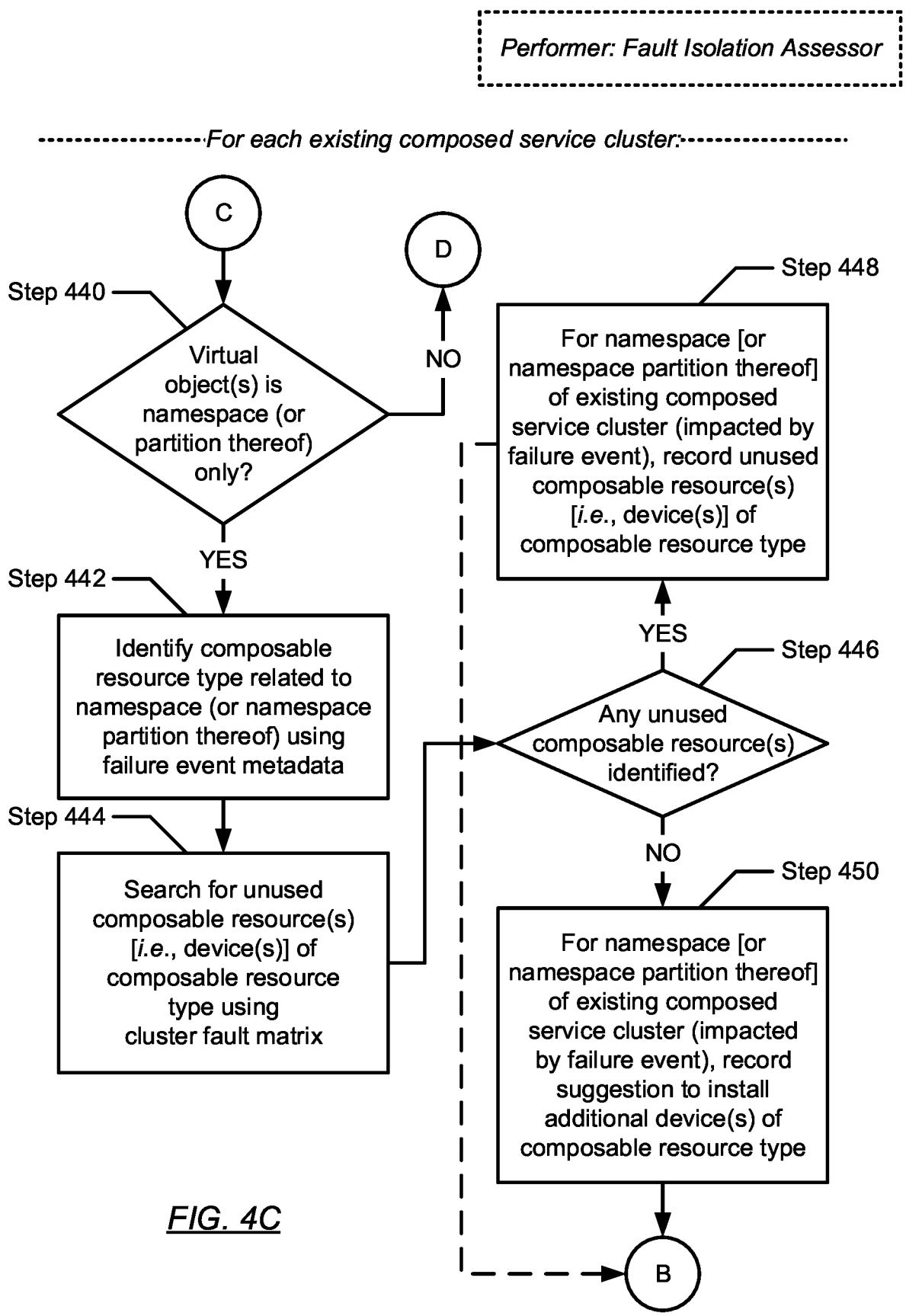

Turning to FIG. 4C, in Step 440, following the alternate determination (made in Step 422) that the virtual object(s), identified based on the search (performed in Step 406) using at least the cluster fault matrix (obtained in Step 404) for the existing composed service cluster, is not a single virtual object in the form of an existing composed service of the existing composed service cluster, a determination is made as to whether the identified virtual object(s) is a single virtual object in the form of a namespace (or a namespace partition thereof). In one or many embodiment(s) described herein, if it is determined that the identified virtual object(s) is indeed a single virtual object in the form of a namespace (or a namespace partition thereof), then the method proceeds to Step 442. On the other hand, in one or many other embodiment(s) described herein, if it is alternatively determined that the identified virtual object(s) is/are not a single virtual object in the form of a namespace (or a namespace partition thereof), then the method alternatively proceeds to Step 460 (see e.g., FIG. 4D).

In Step 442, following the determination (made in Step 440) that the virtual object(s), identified based on the search (performed in Step 406) using at least the cluster fault matrix (obtained in Step 404) for the existing composed service cluster, is a single virtual object in the form of a namespace (or a namespace partition thereof), a composable resource type, related to said namespace (or said namespace partition thereof), is identified. In one or many embodiment(s) described herein, the composable resource type may reference a storage type, a memory type, or an accelerator type.

In Step 444, the cluster fault matrix (obtained in Step 404) is used to search for any unused composable resource(s) of the composable resource type (identified in Step 442). In one or many embodiment(s) described herein, an unused composable resource may refer to a physical infrastructure component (e.g., a storage device, a memory device, or an accelerator device) that supports one of the three types (e.g., storage, memory, or accelerator) of composable resources (see e.g., FIG. 1B) and may be unused by any of the existing composed service(s) of the existing composed service cluster.

In Step 446, a determination is made as to whether the search (performed in Step 44), using the cluster fault matrix (obtained in Step 404), identified any unused composable resource(s) (e.g., a storage device, a memory device, or an accelerator device). Within the cluster fault matrix [N, M], any element (n, m) may correspond to a given possible failure event (mapped to row n) and a given virtual object (mapped to column m). For any unused composable resource(s) (e.g., at least one storage device, at least one memory device, or at least one accelerator device) to be identified: first, identify one or more rows of the cluster fault matrix corresponding to a possible failure event related to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B); and, second, filter the identified row(s) of the cluster fault matrix to identify at least a subset of said identified row(s) each reflecting all zero (0) values there-throughout.

As such, in one or many embodiment(s) described herein, if it is determined that at least one unused composable resource, of the composable resource type (identified in Step 442), has been identified based on the search (performed in Step 444), then the method proceeds to Step 448. On the other hand, in one or many other embodiment(s) described herein, if it is alternatively determined that no unused composable resource(s), of the composable resource type (identified in Step 442), have been identified based on the search (performed in Step 444), then the method alternatively proceeds to Step 450.

In Step 448, following the determination (made in Step 446) that at least one unused composable resource, of the composable resource type (identified in Step 442), has been identified based on the search (performed in Step 444), the identified unused composable resource(s), of the composable resource type, is/are recorded. In one or many embodiment(s) described herein, recordation of the unused composable resource(s) may, for example, entail collecting identification information (e.g., a storage device identifier (ID), a memory device ID, or an accelerator device ID) associated therewith.

Hereinafter, the method proceeds to Step 412 (see e.g., FIG. 4A).

In Step 450, following the alternate determination (made in Step 446) that no unused composable resource(s), of the composable resource type (identified in Step 442), have been identified based on the search (performed in Step 444), one or more suggestions is/are recorded. In one or many embodiment(s) described herein, the recorded suggestion(s) may be devised with the intention of maximizing fault isolation amongst the existing composed service(s) of the existing composed service cluster. By way of an example, a suggestion may reference an expansion of the service composition infrastructure by installing one or more additional physical infrastructure components (e.g., a storage device, a memory device, or an accelerator device).

Hereinafter, the method proceeds to Step 412 (see e.g., FIG. 4A).

Figure 4D:
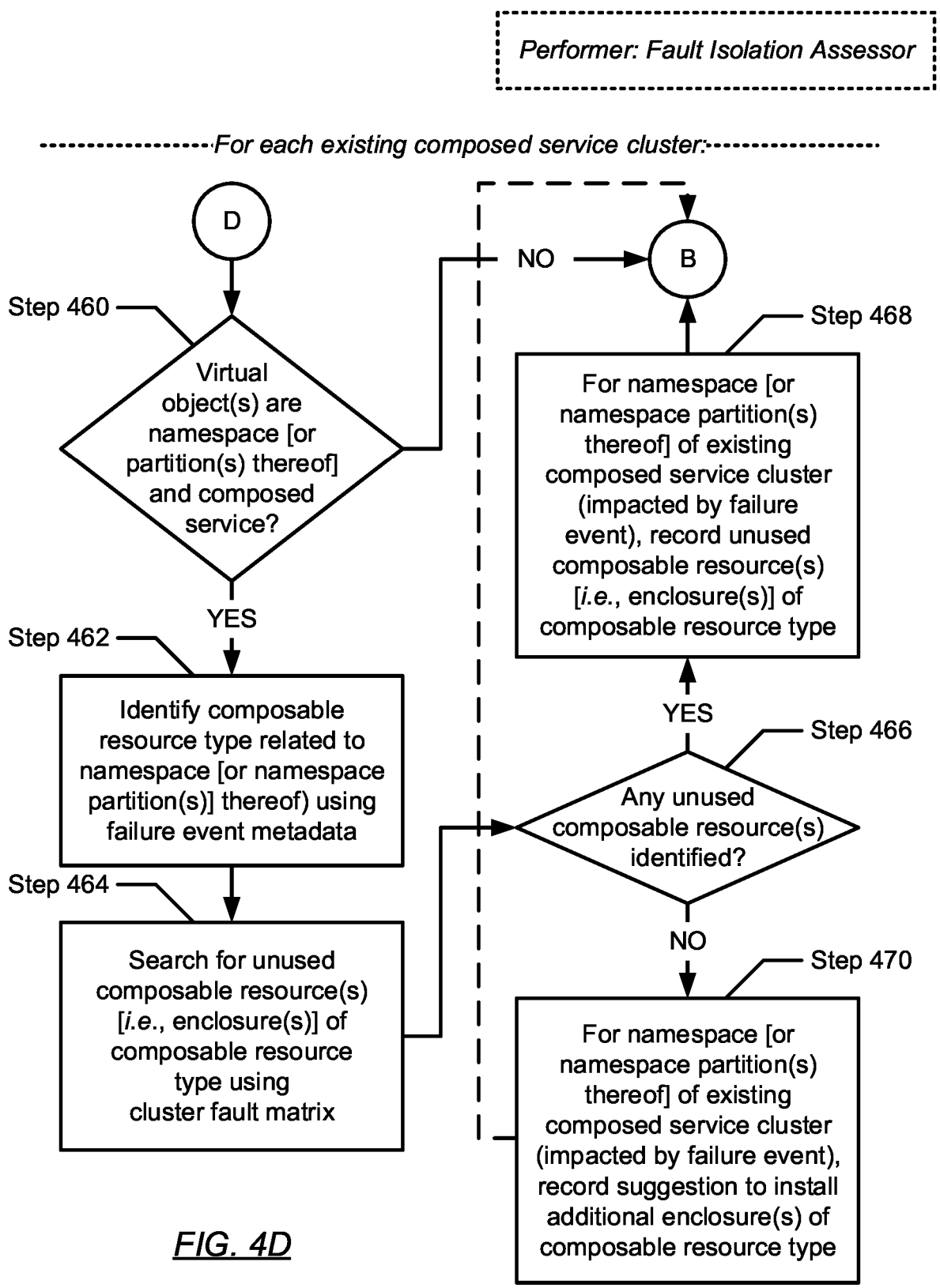

Turning to FIG. 4D, in Step 460, following the alternate determination (made in Step 440) that the virtual object(s), identified based on the search (performed in Step 406) using at least the cluster fault matrix (obtained in Step 404) for the existing composed service cluster, is not a single virtual object in the form of a namespace (or a namespace partition thereof), a determination is made as to whether the identified virtual object(s) are multiple virtual objects in the form of at least one namespace (or a namespace partition thereof) and an existing composed service of the existing composed service cluster. In one or many embodiment(s) described herein, if it is determined that the identified virtual object(s) are indeed multiple virtual objects in the form of at least one namespace (or a namespace partition thereof) and an existing composed service of the existing composed service cluster, then the method proceeds to Step 462. On the other hand, in one or many other embodiment(s) described herein, if it is alternatively determined that the identified virtual object(s) are not multiple virtual objects in the form of at least one namespace (or a namespace partition thereof) and an existing composed service of the existing composed service cluster, then the method alternatively proceeds to Step 412 (described above).

In Step 462, following the determination (made in Step 460) that the virtual object(s), identified based on the search (performed in Step 406) using at least the cluster fault matrix (obtained in Step 404) for the existing composed service cluster, are multiple virtual objects in the form of at least one namespace (or a namespace partition thereof) and an existing composed service of the existing composed service cluster, a composable resource type, related to said at least one namespace (or said namespace partition thereof), is identified. In one or many embodiment(s) described herein, each composable resource type may reference a storage type, a memory type, or an accelerator type.

In Step 464, the cluster fault matrix (obtained in Step 404) is used to search for any unused composable resource(s) of the composable resource type (identified in Step 462). In one or many embodiment(s) described herein, an unused composable resource may refer to a physical infrastructure component (e.g., a composable storage enclosure, a composable memory enclosure, or a composable accelerator enclosure) that supports one of the three types (e.g., storage, memory, or accelerator) of composable resources (see e.g., FIG. 1B) and may be unused by any of the existing composed service(s) of the existing composed service cluster.

In Step 466, a determination is made as to whether the search (performed in Step 464), using the cluster fault matrix (obtained in Step 404), identified any unused composable resource(s) (e.g., a composable storage enclosure, a composable memory enclosure, or a composable accelerator enclosure). Within the cluster fault matrix [N, M], any element (n, m) may correspond to a given possible failure event (mapped to row n) and a given virtual object (mapped to column m). For any unused composable resource(s) (e.g., at least one composable storage enclosure, at least one composable memory enclosure, or at least one composable accelerator enclosure) to be identified: first, identify one or more rows of the cluster fault matrix corresponding to a possible failure event related to a physical infrastructure component (e.g., a storage device, a composable storage enclosure, a memory device, a composable memory enclosure, an accelerator device, or a composable accelerator enclosure) that supports one of the three types (e.g., storage, memory, or accelerator) of composable resources (see e.g., FIG. 1B); and, second, filter the identified row(s) of the cluster fault matrix to identify at least a subset of said identified row(s) each reflecting all zero (0) values there-throughout.

As such, in one or many embodiment(s) described herein, if it is determined that at least one unused composable resource, of the composable resource type (identified in Step 462), has been identified based on the search (performed in Step 464), then the method proceeds to Step 468. On the other hand, in one or many other embodiment(s) described herein, if it is alternatively determined that no unused composable resource(s), of the composable resource type (identified in Step 462), have been identified based on the search (performed in Step 464), then the method alternatively proceeds to Step 470.

In Step 468, following the determination (made in Step 466) that at least one unused composable resource, of the composable resource type (identified in Step 462), has been identified based on the search (performed in Step 464), the identified unused composable resource(s) (e.g., at least one composable storage enclosure, at least one composable memory enclosure, or at least one composable accelerator enclosure), of the composable resource type, is/are recorded. In one or many embodiment(s) described herein, recordation of the unused composable resource(s) may, for example, entail collecting identification information (e.g., a composable storage enclosure identifier (ID), a composable memory enclosure ID, or a composable accelerator enclosure ID) associated therewith.

Hereinafter, the method proceeds to Step 412 (see e.g., FIG. 4A).

In Step 470, following the alternate determination (made in Step 466) that no unused composable resource(s) (e.g., at least one composable storage enclosure, at least one composable memory enclosure, or at least one composable accelerator enclosure), of the composable resource type (identified in Step 462), have been identified based on the search (performed in Step 464), one or more suggestions is/are recorded. In one or many embodiment(s) described herein, the recorded suggestion(s) may be devised with the intention of maximizing fault isolation amongst the existing composed service(s) of the existing composed service cluster. By way of an example, a suggestion may reference an expansion of the service composition infrastructure by installing one or more additional physical infrastructure components (e.g., a composable storage enclosure, a composable memory enclosure, or a composable accelerator enclosure).

Hereinafter, the method proceeds to Step 412 (see e.g., FIG. 4A).

Figure 4E:
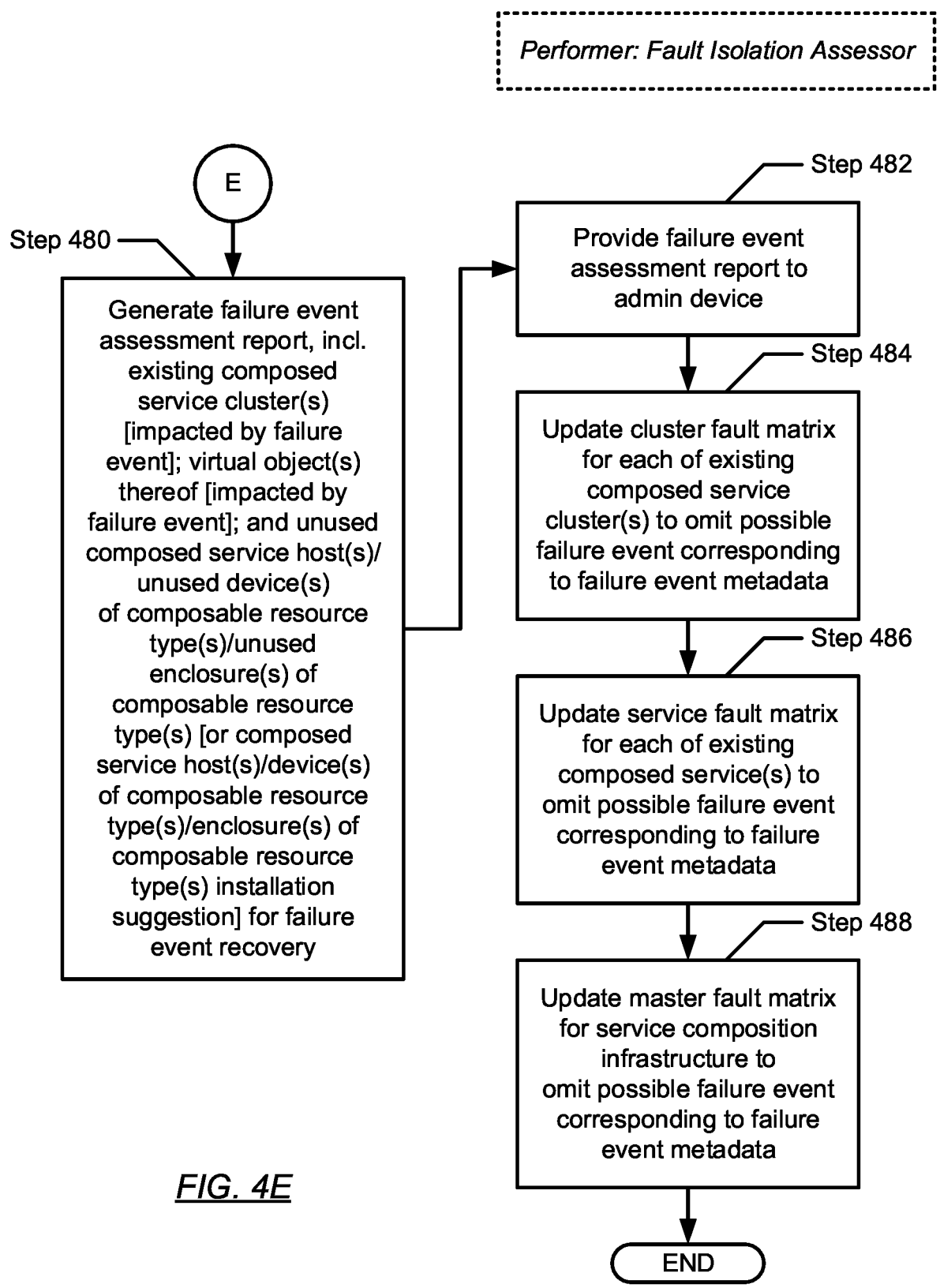

Turning to FIG. 4E, in Step 480, following the alternate determination (made in Step 412) that all existing composed service cluster(s) (identified in Step 402) have undergone processing/assessment, a failure event assessment report is generated. In one or many embodiment(s) described herein, the failure event assessment report may include, but is not limited to: the existing composed service cluster(s) (recorded in Step 414) deemed to have been impacted by the failure event (to which the failure event notice received in Step 400 pertains); the virtual object(s) (recorded in Step 420) for each of said recorded existing composed service cluster(s), where said virtual object(s) is/are deemed to have been impacted by said failure event; and, for said recorded virtual object(s) (e.g., an existing composed service, a namespace (or a namespace partition thereof, or at least one namespace (or at least one namespace partition thereof) and an existing composed service) for each of said recorded existing composed service cluster(s): either (i) (a) at least one unused composed service host (recorded in Step 430) representing one or more existing composed service hosts that can replace the failed composed service host (involved with the failure event) while maximizing fault isolation, (b) at least one unused storage device, at least one memory device, or at least one accelerator device (recorded in Step 448) representing one or more existing storage/memory/accelerator devices that can replace the failed storage/memory/accelerator device (involved with the failure event) while maximizing fault isolation, or (c) at least one unused composable storage enclosure, at least one unused composable memory enclosure, or at least one unused composable accelerator enclosure (recorded in Step 468) representing one or more existing composable storage/memory/accelerator enclosures that can replace the failed composable storage/memory/accelerator enclosure (involved with the failure event) while maximizing fault isolation; or, (ii) (a) the suggestion(s) (recorded in Step 432) respective to said failed composed service host to facilitate failure event recovery, (b) the suggestion(s) (recorded in Step 450) respective to said failed storage/memory/accelerator device to facilitate failure event recovery, or (c) the suggestion(s) (recorded in Step 470) respect to said failed composable storage/memory/accelerator enclosure to facilitate failure event recovery.

In Step 482, the failure event assessment report (generated in Step 480) is transmitted, or otherwise provided, to the admin device (see e.g., FIG. 1A). Thereafter, in one or many embodiment(s) described herein, any system administrator(s), operating the admin device, may review the failure event assessment report and act (e.g., select an unused existing composed service host to replace the failed composed service host should that be the case, select an unused existing storage device to replace the failed storage device should that be the case, select an unused existing memory device to replace the failed memory device should that be the case, select an unused existing accelerator device to replace the failed accelerator device should that be the case, select an unused existing composable storage enclosure to replace the failed composable storage enclosure should that be the case, select an unused existing composable memory enclosure to replace the failed composable memory enclosure should that be the case, select an unused existing composable accelerator enclosure to replace the failed composable accelerator enclosure should that be the case, follow the suggestion(s) offered with respect to the failed composed service host should no unused existing composed service host(s) be available, follow the suggestion(s) offered with respect to the failed storage device should no unused existing storage device(s) be available, follow the suggestion(s) offered with respect to the failed memory device should no unused existing memory device(s) be available, follow the suggestion(s) offered with respect to the failed accelerator device should no unused existing accelerator device(s) be available, follow the suggestion(s) offered with respect to the failed composable storage enclosure should no unused existing composable storage enclosure(s) be available, follow the suggestion(s) offered with respect to the failed composable memory enclosure should no unused existing composable memory enclosure(s) be available, follow the suggestion(s) offered with respect to the failed composable accelerator enclosure should no unused existing composable accelerator enclosure(s) be available, etc.) appropriately to recover from the failure event (to which the failure event notice received in Step 400 pertains) while maximizing the fault isolation between existing composed service(s) within each of the existing composed service cluster(s) (identified in Step 402).

In Step 484, the cluster fault matrix (obtained in Step 404), for each existing composed service cluster (identified in Step 402), is updated. More specifically, in one or many embodiment(s) described herein, updating any cluster fault matrix [N, M] may entail omitting the possible failure event (i.e., an entire row n) matching, relating, or corresponding to at least a portion of the failure event metadata (enclosed within the failure event notice received in Step 400). Through said omission, the failed physical infrastructure component (e.g., a composed service host, a storage device, a composable storage enclosure, a memory device, a composable memory enclosure, an accelerator device, or a composable accelerator enclosure) may be removed from being represented in any cluster fault matrix and, more importantly, from being accounted for in future fault isolation assessments.

In Step 486, the service fault matrix, for each existing composed service in each existing composed service cluster (identified in Step 402), is updated. More specifically, in one or many embodiment(s) described herein, updating any service fault matrix [N, M] may entail omitting the possible failure event (i.e., an entire row n) matching, relating, or corresponding to at least a portion of the failure event metadata (enclosed within the failure event notice received in Step 400). Through said omission, the failed physical infrastructure component (e.g., a composed service host, a storage device, a composable storage enclosure, a memory device, a composable memory enclosure, an accelerator device, or a composable accelerator enclosure) may be removed from being represented in any service fault matrix and, more importantly, from being accounted for in future fault isolation assessments.

In Step 488, the master fault matrix, for the service composition infrastructure, is updated. More specifically, in one or many embodiment(s) described herein, updating the master fault matrix [N, M] may entail omitting the possible failure event (i.e., an entire row n) matching, relating, or corresponding to at least a portion of the failure event metadata (enclosed within the failure event notice received in Step 400). Through said omission, the failed physical infrastructure component (e.g., a composed service host, a storage device, a composable storage enclosure, a memory device, a composable memory enclosure, an accelerator device, or a composable accelerator enclosure) may be removed from being represented in the master fault matrix and, more importantly, from being accounted for in future fault isolation assessments.

Figure 5:
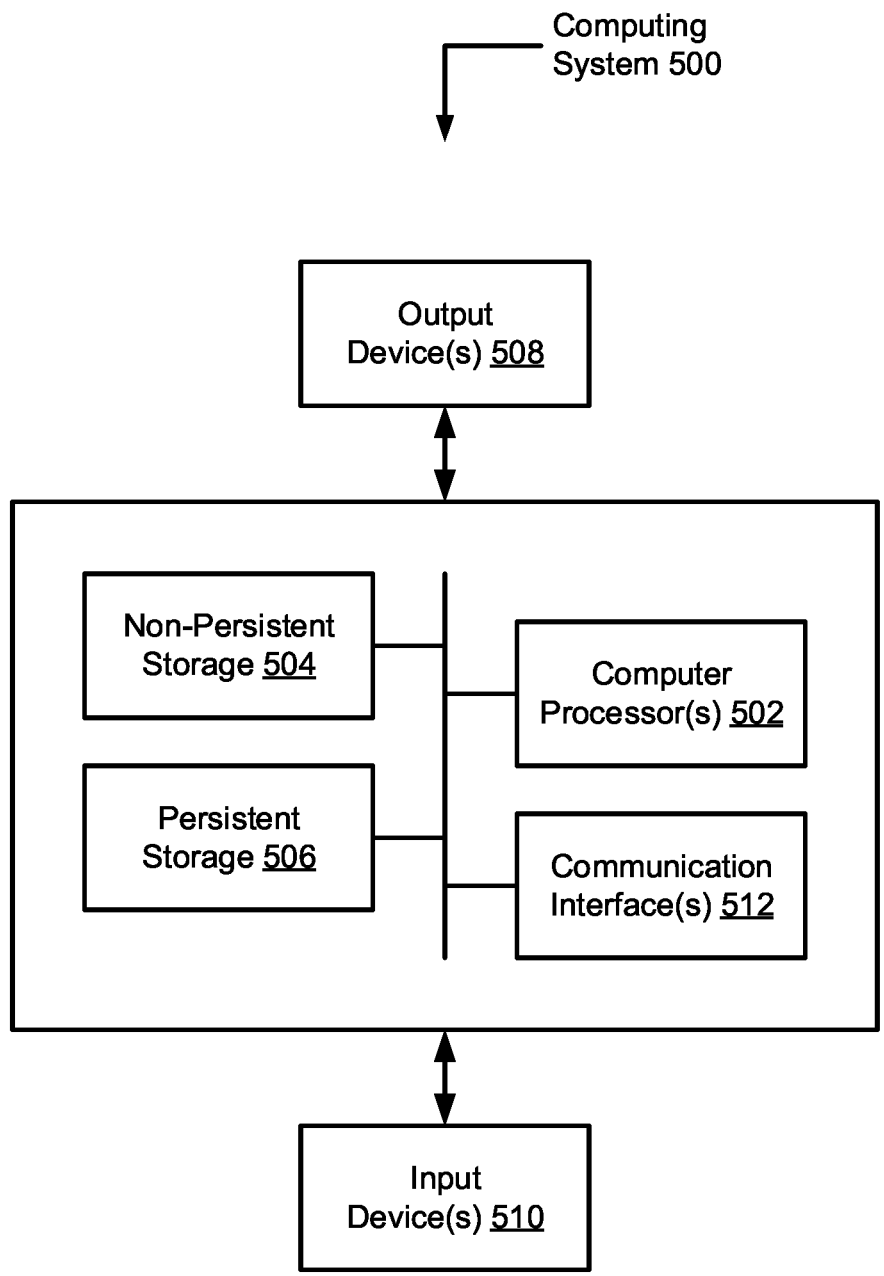
FIG. 5 shows a computing system in accordance with one or more embodiments described herein.

FIG. 5 shows a computing system in accordance with one or more embodiments described herein. The computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one or many embodiment(s) described herein, the computer processor(s) (502) may be an integrated circuit for processing instructions. For example, the computer processor(s) may be one or more cores or micro-cores of a central processing unit (CPU) and/or a graphics processing unit (GPU). The computing system (500) may also include one or more input devices (510), such as a touchscreen, keyboard, mouse, microphone, touchpad, electronic pen, or any other type of input device. Further, the communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

In one or many embodiment(s) described herein, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments described herein.

While the technology has been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for processing service fault assessment requests, the method comprising:
   receiving a service fault assessment request concerning a new composed service;
   making a determination that the new composed service is already configured;
   based on the determination:
      building a service fault matrix for the new composed service;
      obtaining a cluster fault matrix for a composed service cluster to which the new composed service belongs;
      making a second determination, based on a search performed using the service fault matrix and the cluster fault matrix, that an overlapping composable resource has been identified;
      identifying a composable resource type of the overlapping composable resource;
      making a third determination, based on a second search performed using the cluster fault matrix, that an unused composable resource of the composable resource type has been identified;
      based on the third determination:
         generating a service fault assessment report comprising identification metadata associated with the overlapping composable resource, and identification metadata associated with the unused composable resource;
         providing, to an admin device, the service fault assessment report in response to the service fault assessment request; and
         replacing, by the admin device, based upon the service fault assessment report, the overlapping composable resource with the unused composable resource to cause the new composed service to be performed by the unused composable resource.

2. The method of claim 1, wherein the service fault matrix correlates possible failure events with at least one virtual object related to the new composed service.

3. The method of claim 2, wherein the at least one virtual object is at least one selected from a group of virtual objects comprising at least one storage namespace partition, at least one memory namespace partition, and at least one accelerator namespace partition.

4. The method of claim 1, wherein the overlapping composable resource is one selected from a group of composable resources comprising a storage device, a memory device, an accelerator device, a composable storage enclosure, a composable memory enclosure, and a composable accelerator enclosure.

5. The method of claim 1, wherein the composable resource type comprises a storage type, a memory type, or an accelerator type.

6. The method of claim 1, the method further comprising:
receiving a second service fault assessment request concerning a second new composed service;
making a third determination that the second new composed service is yet to be configured;
based on the third determination:
obtaining a second cluster fault matrix for a second composed service cluster to which the second new composed service belongs;
for each composable resource type in a plurality of composable resource types:
making a fourth determination, based on a second search performed using the second cluster fault matrix, that either an unused composable resource of the composable resource type has been identified or zero unused composable resources of the composable resource type have been identified;
generating a second service fault assessment report based on the third determination made for each composable resource type in the plurality of composable resource types; and
providing the second service fault assessment report in response to the second service fault assessment request.

7. The method of claim 6, wherein:
for a first composable resource type in the plurality of composable resource types:
the unused composable resource of the first composable resource type has been identified through the fourth determination; and
for a second composable resource type in the plurality of composable resource types:
the zero unused composable resources of the second composable resource type have been identified through the fourth determination,
wherein the second service fault assessment report comprises:
second identification metadata associated with the unused composable resource of the first composable resource type; and
a suggestion proposing an installation of an additional composable resource of the second composable resource type.

8. The method of claim 1, the method further comprising:
receiving a second service fault assessment request concerning a second new composed service;
making a third determination that the second new composed service is already configured;
based on the third determination:
building a second service fault matrix for the second new composed service;
obtaining a second cluster fault matrix for a second composed service cluster to which the second new composed service belongs;
making a fourth determination, based on a second search performed using the service fault matrix and the cluster fault matrix, that zero overlapping composable resources have been identified;
based on the fourth determination:
generating a second service fault assessment report indicating the second new composed service is fault isolated; and
providing the second service fault assessment report in response to the second service fault assessment request.

9. The method of claim 8, the method further comprising:
further based on the fourth determination:
merging the second service fault matrix and the second cluster fault matrix to produce a new cluster fault matrix for the second composed service cluster.

10. A non-transitory computer readable medium comprising computer readable program code, which when executed by a computer processor, enables the computer processor to perform a method for processing service fault assessment requests, the method comprising:
receiving a service fault assessment request concerning a new composed service;
making a determination that the new composed service is already configured;
based on the determination:
building a service fault matrix for the new composed service;
obtaining a cluster fault matrix for a composed service cluster to which the new composed service belongs;
making a second determination, based on a search performed using the service fault matrix and the cluster fault matrix, that an overlapping composable resource has been identified;
identifying a composable resource type of the overlapping composable resource;
making a third determination, based on a second search performed using the cluster fault matrix, that an unused composable resource of the composable resource type has been identified;
based on the third determination:
generating a service fault assessment report comprising identification metadata associated with the overlapping composable resource, and identification metadata associated with the unused composable resource;
providing, to an admin device, the service fault assessment report in response to the service fault assessment request; and
replacing, by the admin device, based upon the service fault assessment report, the overlapping composable resource with the unused composable resource to cause the new composed service to be performed by the unused composable resource.

11. The non-transitory computer readable medium of claim 10, wherein the service fault matrix correlates possible failure events with at least one virtual object related to the new composed service.

12. The non-transitory computer readable medium of claim 11, wherein the at least one virtual object is at least one selected from a group of virtual objects comprising at least one storage namespace partition, at least one memory namespace partition, and at least one accelerator namespace partition.

13. The non-transitory computer readable medium of claim 10, wherein the overlapping composable resource is one selected from a group of composable resources comprising a storage device, a memory device, an accelerator device, a composable storage enclosure, a composable memory enclosure, and a composable accelerator enclosure.

14. The non-transitory computer readable medium of claim 10, the method further comprising:
   receiving a second service fault assessment request concerning a second new composed service;
   making a third determination that the second new composed service is already configured;
   based on the third determination:
      building a second service fault matrix for the second new composed service;
      obtaining a second cluster fault matrix for a second composed service cluster to which the second new composed service belongs;
      making a fourth determination, based on a second search performed using the service fault matrix and the cluster fault matrix, that zero overlapping composable resources have been identified;
      based on the fourth determination:
         generating a second service fault assessment report indicating the second new composed service is fault isolated; and
         providing the second service fault assessment report in response to the second service fault assessment request.

15. A system, comprising:
   an admin device; and
   a fault isolation assessor operatively connected to the admin device, and comprising a computer processor configured to perform a method for processing service fault assessment requests, the method comprising:
      receiving, from the admin device, a service fault assessment request concerning a new composed service;
      making a determination that the new composed service is already configured;
      based on the determination:
         building a service fault matrix for the new composed service;
         obtaining a cluster fault matrix for a composed service cluster to which the new composed service belongs;
         making a second determination, based on a search performed using the service fault matrix and the cluster fault matrix, that an overlapping composable resource has been identified;
         identifying a composable resource type of the overlapping composable resource;
         making a third determination, based on a second search performed using the cluster fault matrix, that an unused composable resource of the composable resource type has been identified;
         based on the third determination:
            generating a service fault assessment report comprising identification metadata associated with the overlapping composable resource, and identification metadata associated with the unused composable resource;
            providing, to the admin device, the service fault assessment report in response to the service fault assessment request; and
            replacing, by the admin device, based upon the service fault assessment report, the overlapping composable resource with the unused composable resource to cause the new composed service to be performed by the unused composable resource.

16. The system of claim 15, further comprising:
   a service composition infrastructure operatively connected to the admin device and the fault isolation assessor, and comprising:
   composable storage resources comprising a composable storage enclosure comprising at least one storage device;
   composable memory resources comprising a composable memory enclosure comprising at least one memory device;
   composable accelerator resources comprising a composable accelerator enclosure comprising at least one accelerator device,
   wherein the overlapping composable resource is one selected from a group of composable resources comprising a storage device of the at least one storage device, a memory device of the at least one memory device, an accelerator device of the at least one accelerator device, the composable storage enclosure, the composable memory enclosure, and the composable accelerator enclosure.

* * * * *